United States Patent [19]

Matsuo

[11] Patent Number: 5,381,548
[45] Date of Patent: Jan. 10, 1995

[54] APPARATUS FOR AUTOMATICALLY GENERATING PROGRAMS

[75] Inventor: Akihiko Matsuo, Kawasaki, Japan

[73] Assignee: Fujitsu Limited, Kawasaki, Japan

[21] Appl. No.: 20,091

[22] Filed: Feb. 19, 1993

[30] Foreign Application Priority Data

Feb. 20, 1992 [JP] Japan .................................. 4-033671

[51] Int. Cl.6 .............................................. G06F 9/06
[52] U.S. Cl. ............................. 395/700; 364/DIG. 1; 364/262.5
[58] Field of Search .......................................... 395/700; 364/DIG. 1 MS File, DIG. 2 MS File

[56] References Cited

U.S. PATENT DOCUMENTS

| 4,536,840 | 8/1985 | Borta | 395/700 |
|---|---|---|---|
| 4,831,580 | 5/1989 | Yamada | 364/DIG. 2 |
| 4,949,253 | 8/1990 | Chigira et al. | 364/DIG. 1 |
| 4,956,773 | 9/1990 | Saito et al. | 364/DIG. 1 |
| 5,038,296 | 8/1991 | Sano | 364/DIG. 1 |
| 5,099,413 | 3/1992 | Sakai | 364/DIG. 1 |
| 5,237,691 | 8/1993 | Robinson et al. | 395/700 |

Primary Examiner—Thomas M. Heckler
Attorney, Agent, or Firm—Armstrong, Westerman, Hattori, McLeland & Naughton

[57] ABSTRACT

Connection relationships among prepared program modules are stored so that the modules and the relationships form a network structure that is directed from an initial state through an end state, and a program is generated by determining a path on the network structure and by combining modules along the path. In one aspect of the present invention, the determination of the path is performed in an interactive manner. In another aspect of the present invention, the determination of the path is performed by an inference device that issues user-friendly interrogations to a user and sequentially fixes the path in the network structure according to answers to the interrogations and to conditions effected by selected modules. The network is preferably pruned by taking necessity of modules and/or interaction relationships between modules into account before the path is inferred.

9 Claims, 31 Drawing Sheets

Fig. 2

```
(NAME         procedure    A
 BODY
 "syoriA(fn)
      char *fn;
  {
      int i;
      FILE *fn;

fn = fopen(fn, "R");
       ......

} "
)

(NAME         procedure    C
 BODY
 "syoriC(points, pointMC)
      int points;
      float *pointMC;
  {
      int j;

for (j = 0; j < points; j++)
       ......

```
(NAME      procedure  A
 INPUT     initial  data
 OUTPUT    shape  data  MC
 BEFORE    (initial  state)
 AFTER     (procedure  C)
 X   100
 Y   50
)

(NAME      procedure   C
 INPUT     shape  data  MC
 OUTPUT    shape  data  WC
 BEFORE    (procedure   A, procedure   B)
 AFTER     (procedure   D, procedure   E)
 X   200
 Y   70
)
......
```

Fig. 10

```
(NAME     procedure A
 IF       ((data is polygon)
 EFFECT   ((input is finished),
          (polygon expansion is finished))
)
(NAME     procedure C
 IF       ((polygon expansion is finished))
 EFFECT   ((modeling transformation is finished))
) . . . . . . .
```

Fig. 11

```
(ATTRIBUTE    data
 VALUES      (curved surface, polygon)
 QUESTION    "What is data form"?
 ANSWERS     (("Curved surface is included " curved surface),
              ("Flat surface only " polygon))
)

(ATTRIBUTE   input
 VALUES     (not finished, finished)
) ......
```

PLEASE ANSWER FOLLOWING QUESTIONS:

DO MIRRORLIKE SURFACES EXIST ?  YES  NO

DO TRANSPARENT OBJECTS EXIST ?  YES  NO

ARE SHADOWS OF OBJECTS NECESSARY ?  YES  NO

IS LONG EXECUTION TIME PERMITTED ?  YES  NO

OK  CANCEL

*Fig. 14*

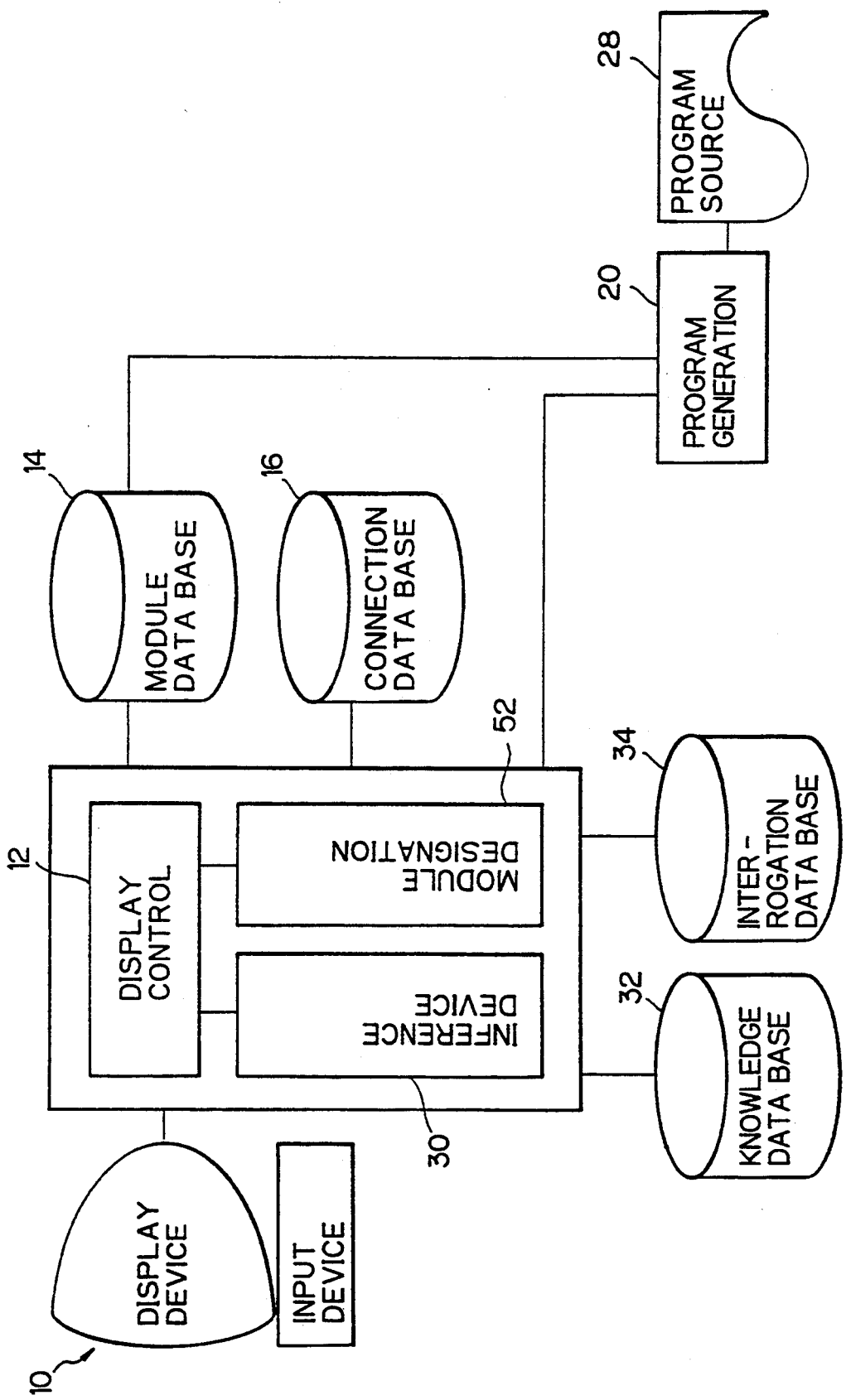

*Fig. 17(A)*
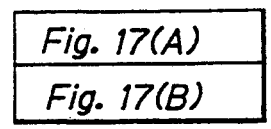
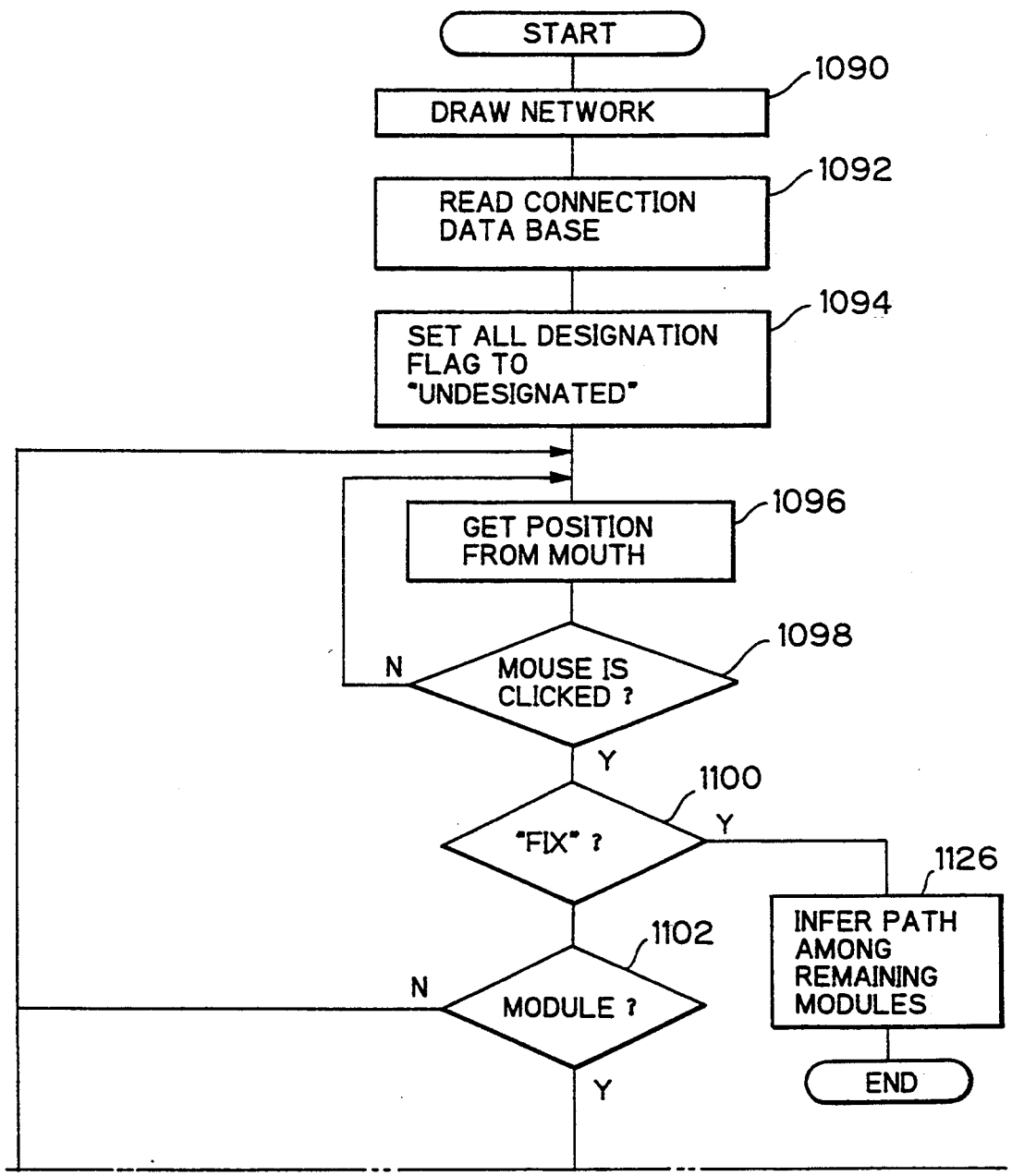

Fig. 25

| | | ... | PROCEDURE E | PROCEDURE F | PROCEDURE G | PROCEDURE H | ... |
|---|---|---|---|---|---|---|---|
| EXISTENCE OF SHADOW | EXIST | ... | MORE ADEQUATE | LESS ADEQUATE | ADEQUATE | LESS ADEQUATE | ... |
| | NOT EXIST | ... | UN-NECESSARY | — | — | MORE ADEQUATE | ... |
| DELICATE SHADING | NECESSARY | ... | — | — | NECESSARY | — | ... |
| | UN-NECESSARY | ... | — | — | LESS ADEQUATE | ADEQUATE | ... |
| ... | | | | | | | |

— : NOT CONCERNED

Fig. 28

| | | | PROCEDURE E | PROCEDURE F | PROCEDURE G | PROCEDURE H | |
|---|---|---|---|---|---|---|---|
| PROCEDURE A | USED | ⋯ | — | UN-NECESSARY | — | — | ⋯ |
| | NOT USED | ⋯ | — | NECESSARY | — | — | ⋯ |
| PROCEDURE B | USED | ⋯ | UN-NECESSARY | — | NECESSARY | UN-NECESSARY | ⋯ |
| | NOT USED | ⋯ | NECESSARY | — | — | — | ⋯ |
| ⋯ | | | | | | | |

APPARATUS FOR AUTOMATICALLY GENERATING PROGRAMS

BACKGROUND OF THE INVENTION

1. Field of the Invention

The present invention relates to an apparatus for automatically generating a program by selecting necessary program modules from among program modules that are prepared in advance and by adequately combining the selected program modules.

2. Description of the Related Art

Composing software programs often requires a great many manpowers. Therefore, various techniques have been proposed for generating a desired program used in a specific field by modularizing in advance program fragments to be used in that field, selecting necessary modules from among the program modules and combining the selected modules.

In one of these techniques, the prepared software modules are represented as boxes on a display screen. The boxes are selected and connected to each other so as to form a flowchart in an interactive manner.

In this method, although a user need not code a program, he must input a flowchart, and he is still required to know which modules should be selected and how the selected modules should be combined. Namely, without knowledge as to functions of each of the modules, knowledge as to ordinal relationship among the modules, and knowledge as to influence of one on another, programs that correctly operate as desired cannot be composed. For this reason, the conventional automatic program generation techniques have not been convenient to users.

SUMMARY OF THE INVENTION

It is an object of the present invention to provide an apparatus for automatically generating programs that simplifies program generation.

In accordance with the present invention there is provided an apparatus for automatically generating a software program by suitably selecting and combining a plurality of prepared program modules, comprising:

means for storing the prepared program modules;

means for storing connection relationships among the prepared program modules so that the prepared program modules and the relationships form a network structure that is directed from an initial state through an end state;

means for selecting program modules from among the prepared program modules so that the selected program modules and the relationships thereof determine a single path extending from the initial state through the end state; and means for generating the software program by taking out the selected program modules from the prepared module storing means and by combining the taken-out program modules along the path.

BRIEF DESCRIPTION OF THE DRAWINGS

FIG. 2 is a diagram showing an example of the contents of the module data base 14;

FIG. 3 is a diagram showing an example of the contents of the connection data base 16;

FIG. 10 is a diagram showing an example of the contents of the knowledge data base 32;

FIG. 11 is a diagram showing an example of the contents of the interrogation data base 34;

FIG. 14 is a diagram showing a practical example of interrogations and choices displayed in a lump;

FIG. 16 is a block diagram of an automatic program generation apparatus according to another embodiment of the present invention;

FIGS. 17(A) and 17(B) are flowcharts showing an operation of the apparatus of FIG. 16;

FIG. 25 is a diagram showing an example of the contents of the module evaluation data table 54;

FIG. 28 is a diagram showing an example of the contents of the module interaction data table 58.

DESCRIPTIONS OF THE PREFERRED EMBODIMENTS

Figure 1:
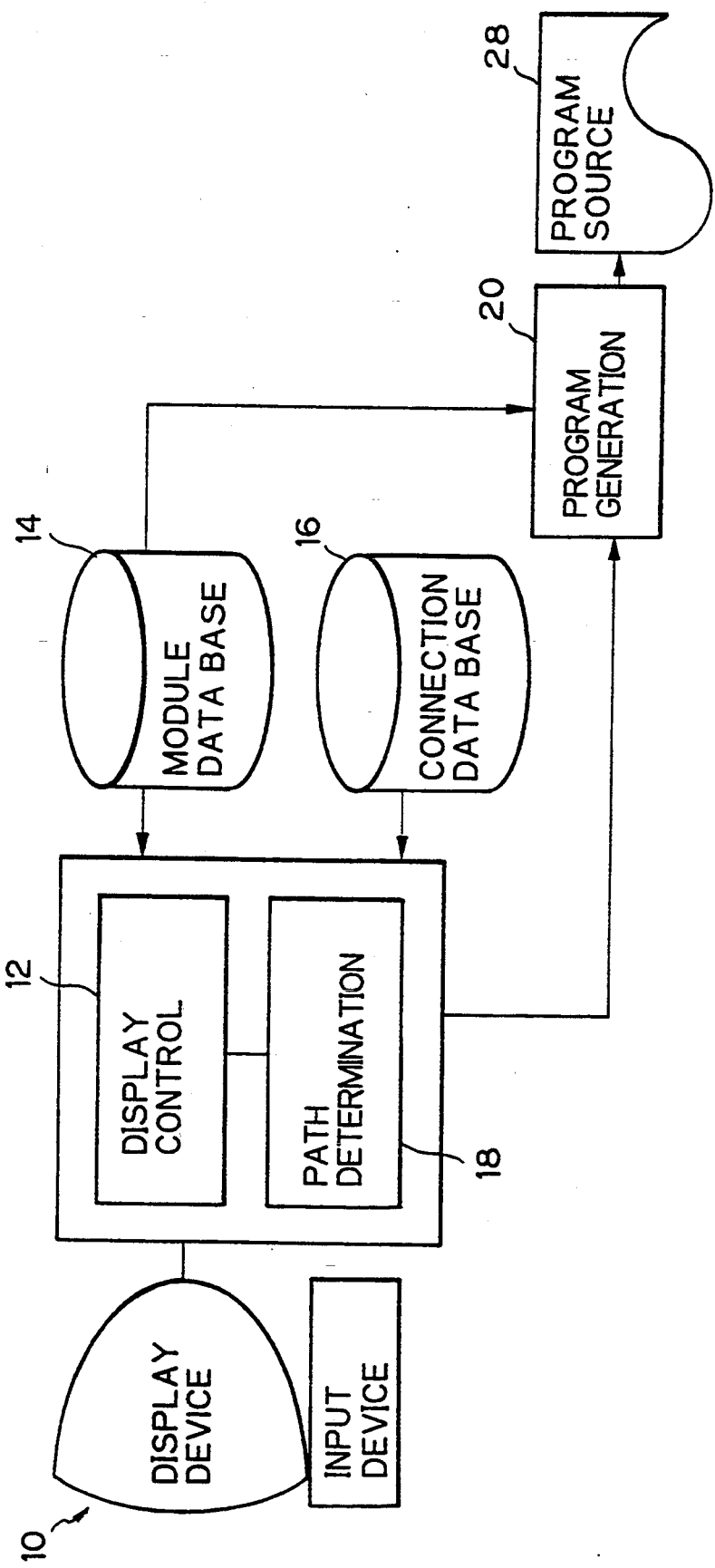
FIG. 1 is a block diagram of an automatic program generation apparatus according to an embodiment of the present invention.

FIG. 1 shows a construction of an automatic program generation apparatus according to an embodiment of the present invention. The apparatus of FIG. 1 includes a display/input device 10, a display control unit 12, a module data base 14, a connection data base 16, a path determination unit 18, and a program generation unit 20.

The display/input device 10 is used for interactively inputting user commands. The module data base 14 stores source code of program modules, as shown in FIG. 2 as an example. In FIG. 2, source code of each program module (procedures A, B, C, . . . ) is shown between double quotation marks immediately after "BODY" and double quotation marks corresponding thereto. The connection data base 16 stores connection relationships among the modules and display positions of the modules, as shown in FIG. 3 as an example. As shown in FIG. 3, input data, output data, preceding module(s), following module(s), an x coordinate and a y coordinate are stored in columns of INPUT, OUTPUT, BEFORE, AFTER, X and Y, respectively, for each of the modules.

Figure 4:
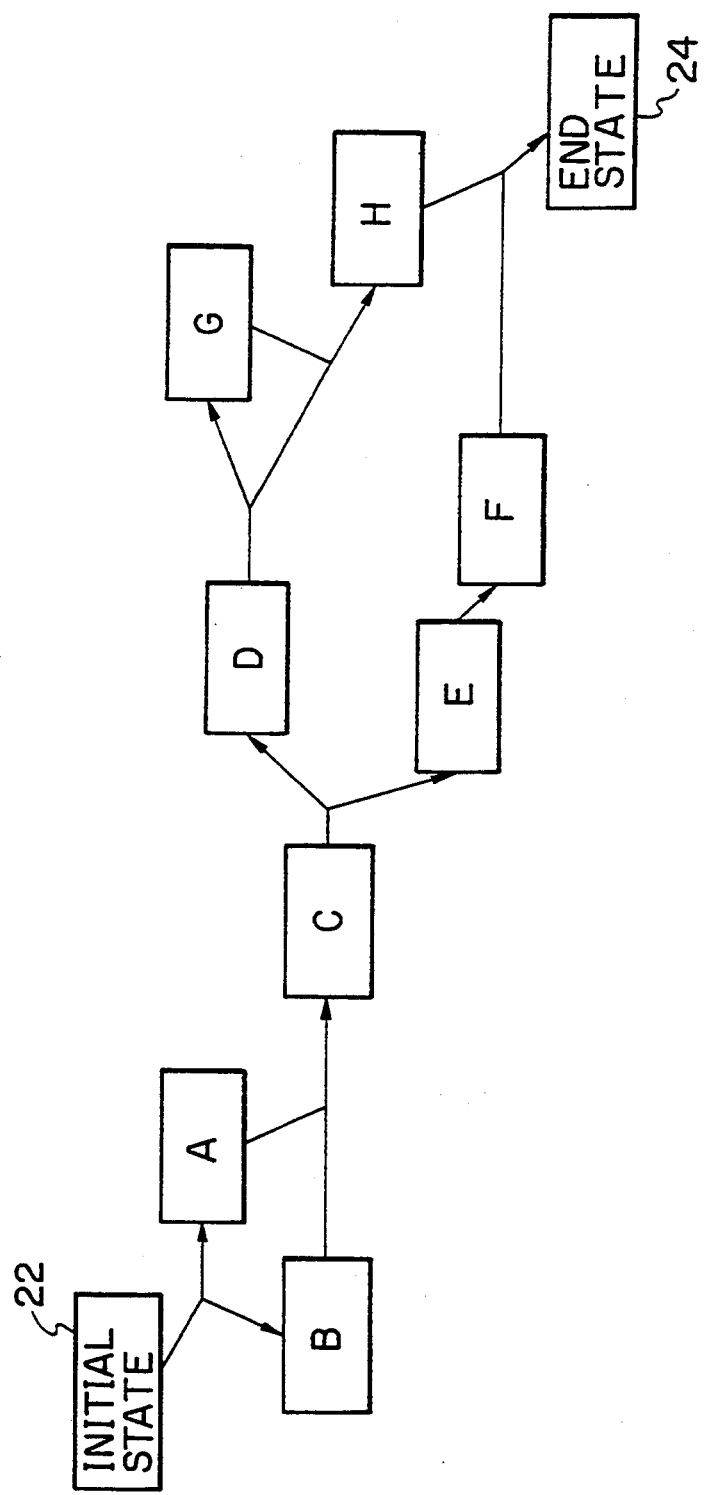
FIG. 4 is a diagram showing an example of a network structure according to the present invention.
Figure 5:
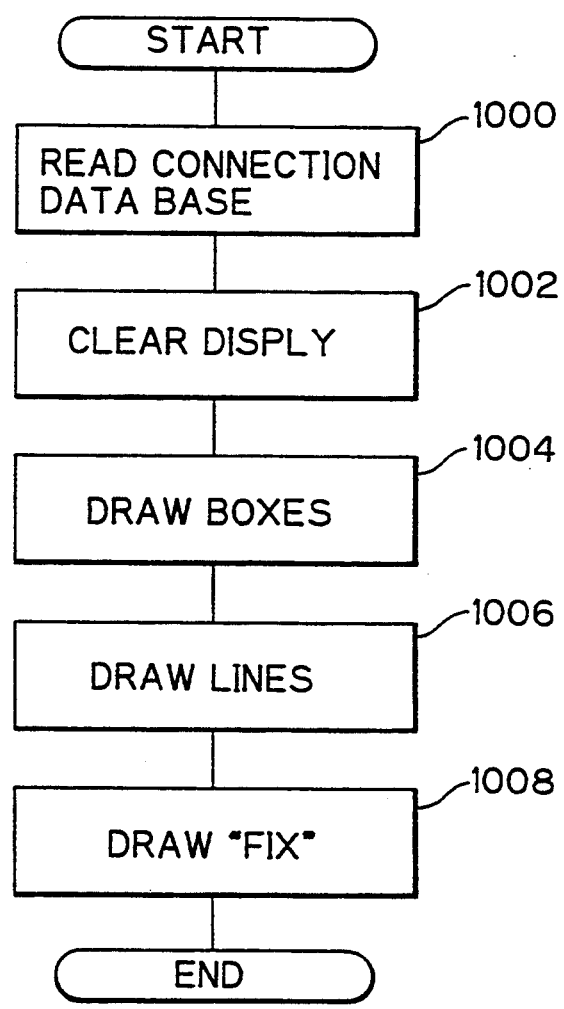
FIG. 5 is a flowchart showing an operation of the display control unit 12.

Initially, the display control unit 12 draws a directed network as shown in FIG. 4 on a display screen of the display/input device 10. FIG. 5 shows the initial operation of the display control unit 12. In step 1000, the display control unit 12 reads the contents of the connection data base 16. After clearing the display screen in step 1002, the display control unit draws boxes representing the modules according to x and y coordinates within the contents of the connection data base 16, in step 1004. In step 1006, lines interconnecting the boxes are drawn according to names of preceding and following modules of each of the modules within the contents of the connection data base 16, to thereby draw the directed network of FIG. 4. Finally, a software key "fix" is drawn in step 1008.

Figure 6A:
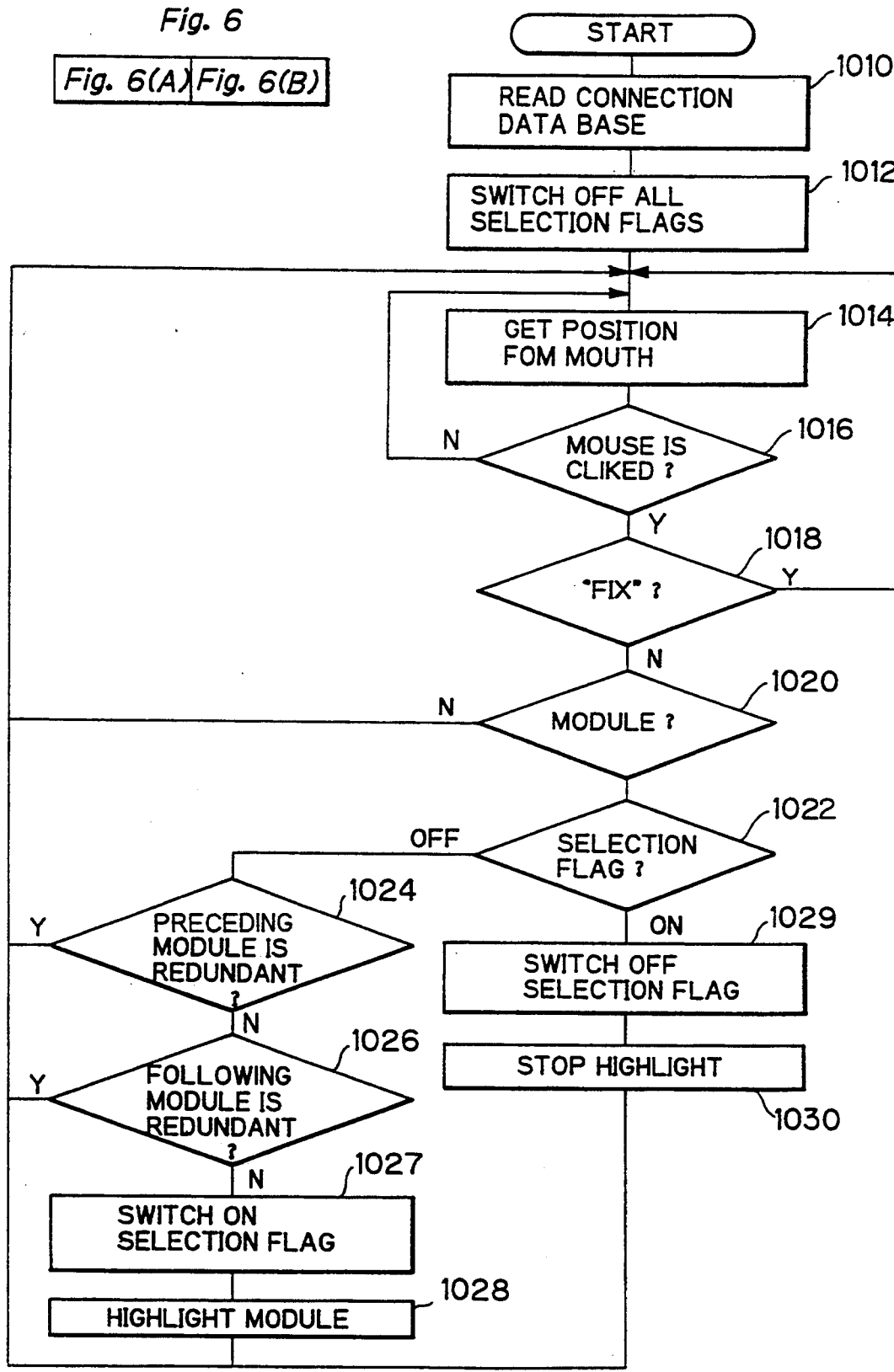
FIGS. 6(A) and 6(B) are flowcharts showing an operation of the path determination unit 18.
Figure 6B:
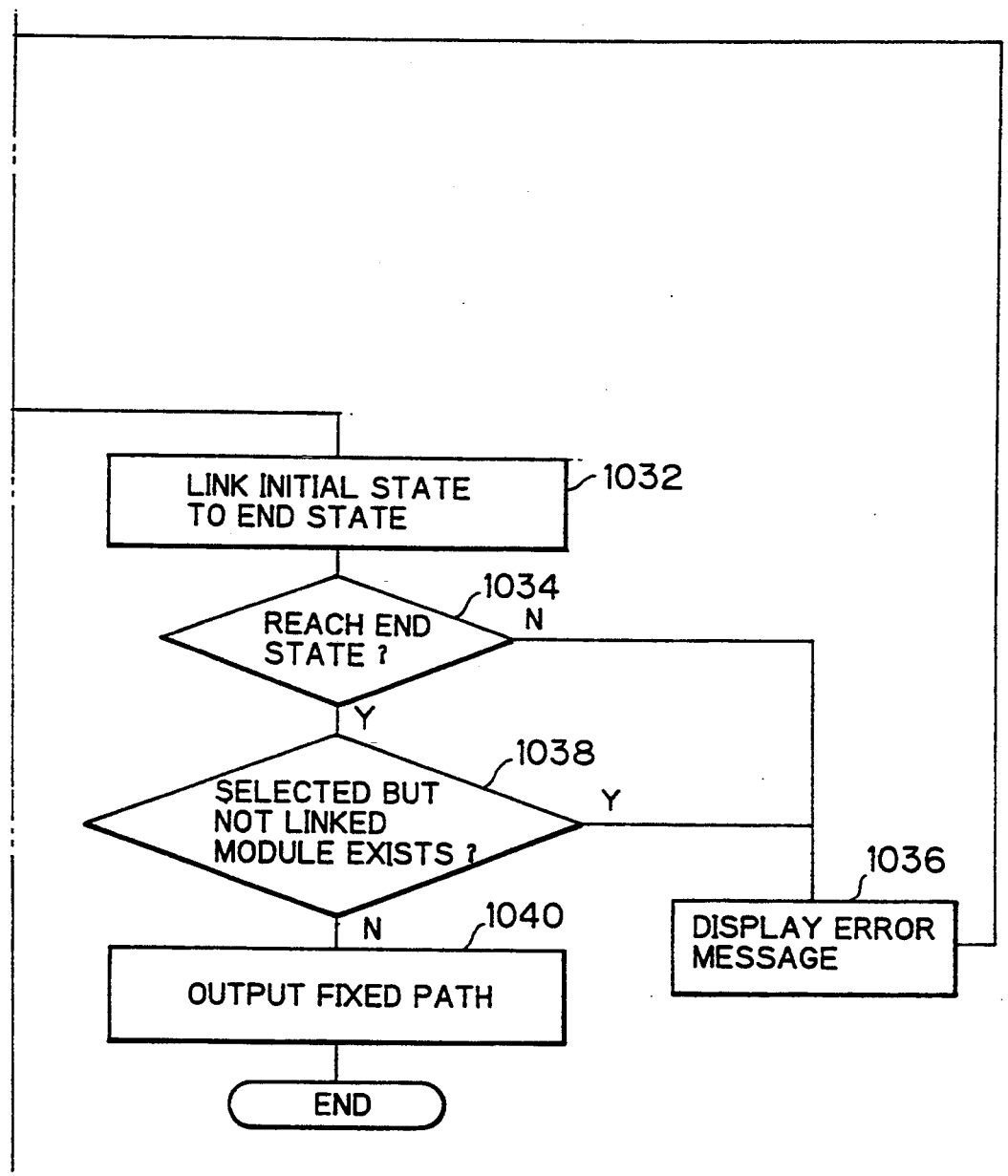

Next, the user interactively selects modules to be used, on the display screen displaying the network. FIG. 6 shows an operation of the path determination unit 18 allowing the interactive module selection.

In step 1010, the path determination unit 18 reads the contents of the connection data base 16, and in step 1012, switches off all of selection flags provided for each of the modules. In step 1014, the position of an indicator displayed on the screen is continuously received from a mouse as the input device until the mouse is clicked in step 1016. If the mouse is clicked, figures located under the indicator are determined, i.e., it is determined which figure is clicked, in steps 1018 and 1020. If a box of a module is clicked, the selection flag corresponding to the clicked module is examined in step 1022. If the selection flag is in an "OFF" state, it is examined based on the names of modules stored in the column "BEFORE" of the connection data base 16 and the selection flags of the preceding modules whether two or more modules preceding the clicked module are redundantly selected, in step 1024. If the preceding module is not redundantly selected, it is examined based on the names of modules stored in the column "AFTER" of the connection data base 16 and the selection flags of the following modules whether two or more modules following the clicked module are redundantly selected, in step 1026. If the following module is not redundantly selected, a selection flag corresponding to the clicked module is switched on in step 1027 and the box of the clicked module is highlighted in step 1028. If the selection flag of the clicked module is in an "ON" state in step 1022, the selection flag is switched off in step 1029, and highlighting of the clicked module is stopped in step 1030.

Figure 7:
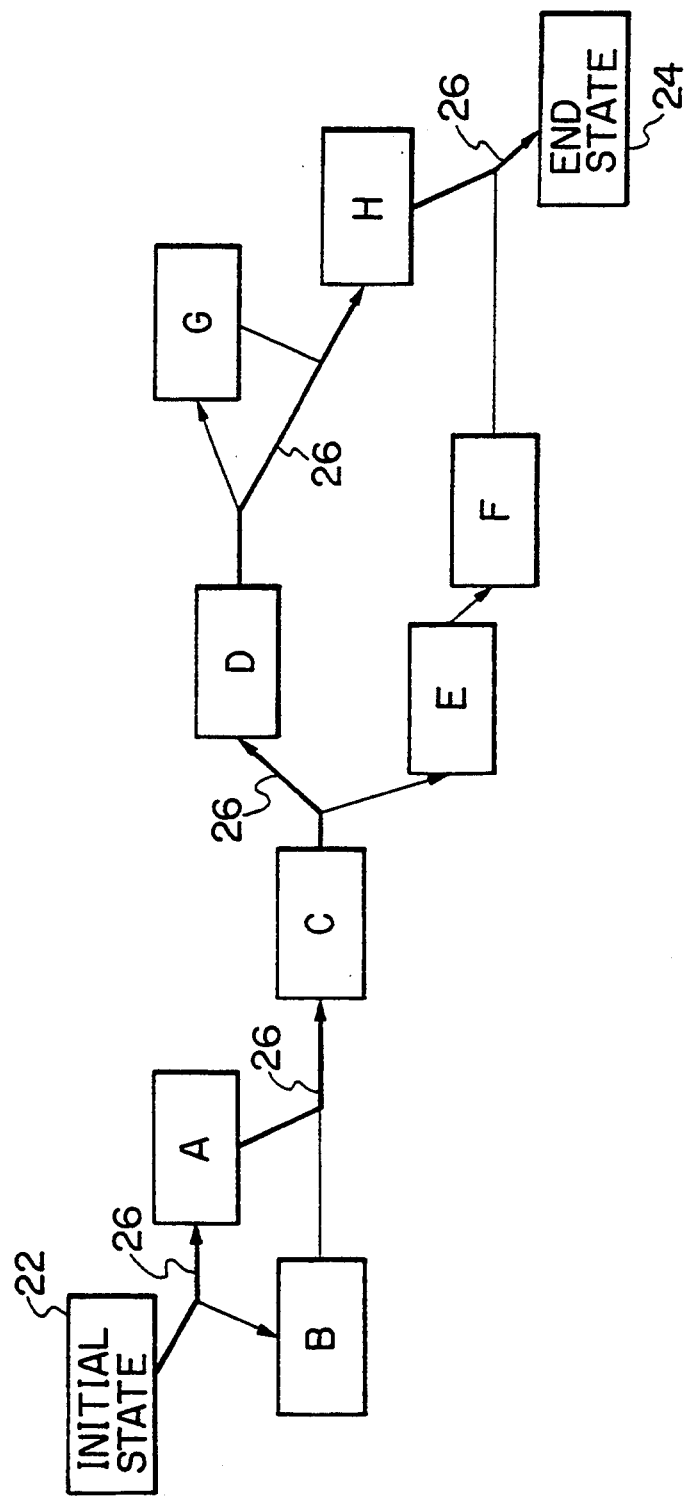
FIG. 7 is a diagram explaining a fixed path on the network structure.

If it is determined that the key "fix" is clicked in step 1018, as shown in FIG. 7, the box of the initial state 22 is linked to the box of the end state 24 through thick lines 26 linking the boxes of the selected modules A, C, D and H. If a path of the thick lines does not reach the box of the end state in step 1034, an error message is displayed in step 1036. If the path reaches the box of the end state, it is examined whether any module box that is selected but is not linked by the thick lines exists in step 1038. If such a box exists, an error message is displayed. If such a box does not exist, the fixed path is output to the program generation unit 20 in step 1040.

Figure 8:
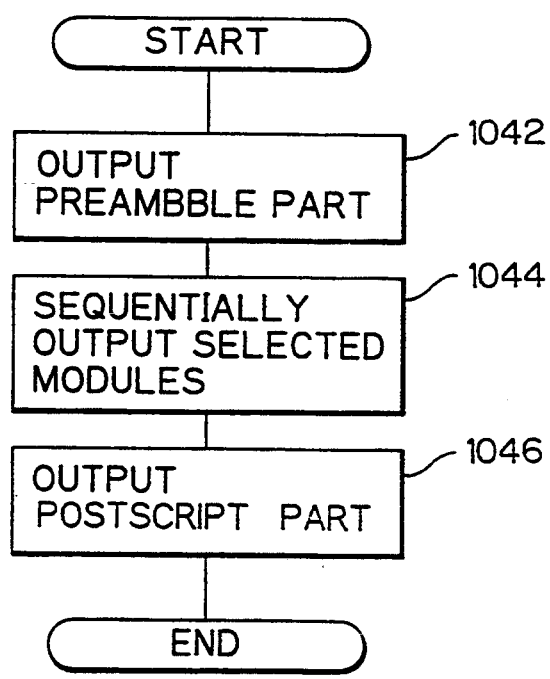
FIG. 8 is a flowchart showing an operation of the program generation unit 20.

The program generation unit 20 outputs a program source list 28 in accordance with the fixed path received from the path determination unit 18. FIG. 8 shows an operation of the program generation unit 20.

In step 1042, a source list of a preamble part is output. The preamble part varies according to program language employed, and for example, includes definitions of variables used in the selected modules. In step 1044 the contents of the module data base 14 are sequentially output according to the fixed path. In step 1046, a source list of a postscript part is output. The postscript part also varies according to program language employed.

In the aforementioned embodiment, since the user can select modules from the network structure that was prepared by an expert in advance, he need not know the ordinal relationship among the modules to create a desired program source, but knowledge as to functions of each modules and knowledge as to influence of one module on another is still necessary for adequately selecting the modules.

Figure 9:
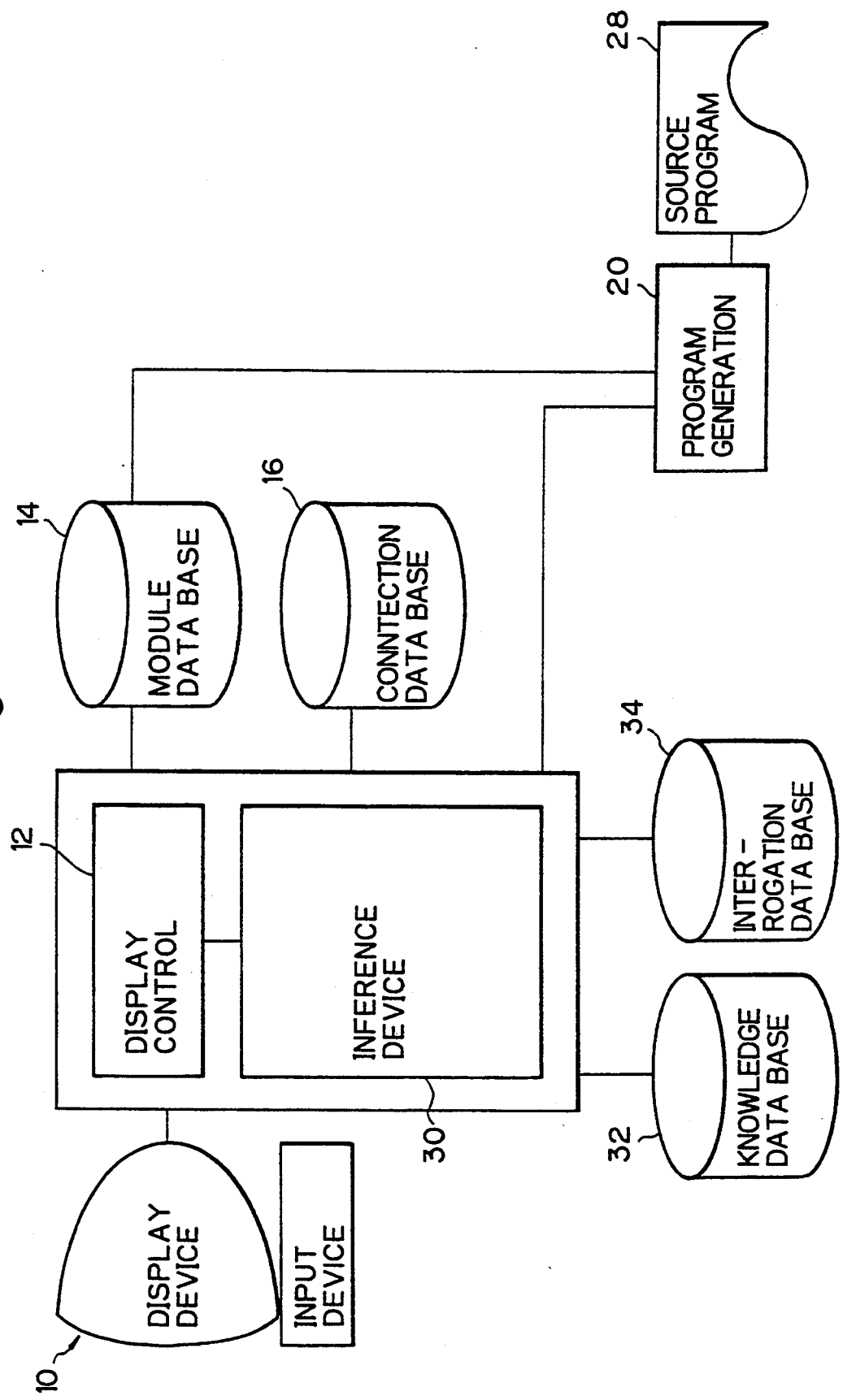
FIG. 9 is a block diagram of an automatic program generation apparatus according to another embodiment of the present invention.

FIG. 9 shows an automatic program generation apparatus according to another embodiment of the present invention. The apparatus of FIG. 9 includes an inference device 30, a knowledge data base 32, and an interrogation data base 34 instead of the path determination unit 18 of FIG. 1.

In this embodiment, the network structure of FIG. 4 is not displayed on the screen, but is internally used. The inference device 30 successively fixes the path from the initial state 22 to the end state 24 along the network structure by successively issuing user-friendly interrogations in order to fix the path where the path diverges and by receiving answers to the interrogations. The interrogations are issued from the inference device 30 by referring to the contents of the knowledge data base 32 and the interrogation data base 34.

FIG. 10 shows an example of the contents of the knowledge data base 32. In a column "IF", a condition(s) that must be satisfied before the module is executed is stored regarding each of the modules prepared. In a column "EFFECT", a condition(s) effected after the module is executed, i.e., effect(s) of the module is stored regarding each of the modules prepared.

FIG. 11 shows an example of the contents of the interrogation data base 34. The contents of the interrogation data base 34 are grouped according to attributes of the conditions such as "data" and "input". In a column "VALUES", values that the condition can assume are stored regarding each of the attributes. In a column "QUESTION", a text of the interrogation displayed to fix the value of the condition and to thereby fix the path is stored. In a column "ANSWERS", texts of choices and values corresponding to the choices are stored.

Figure 12A:
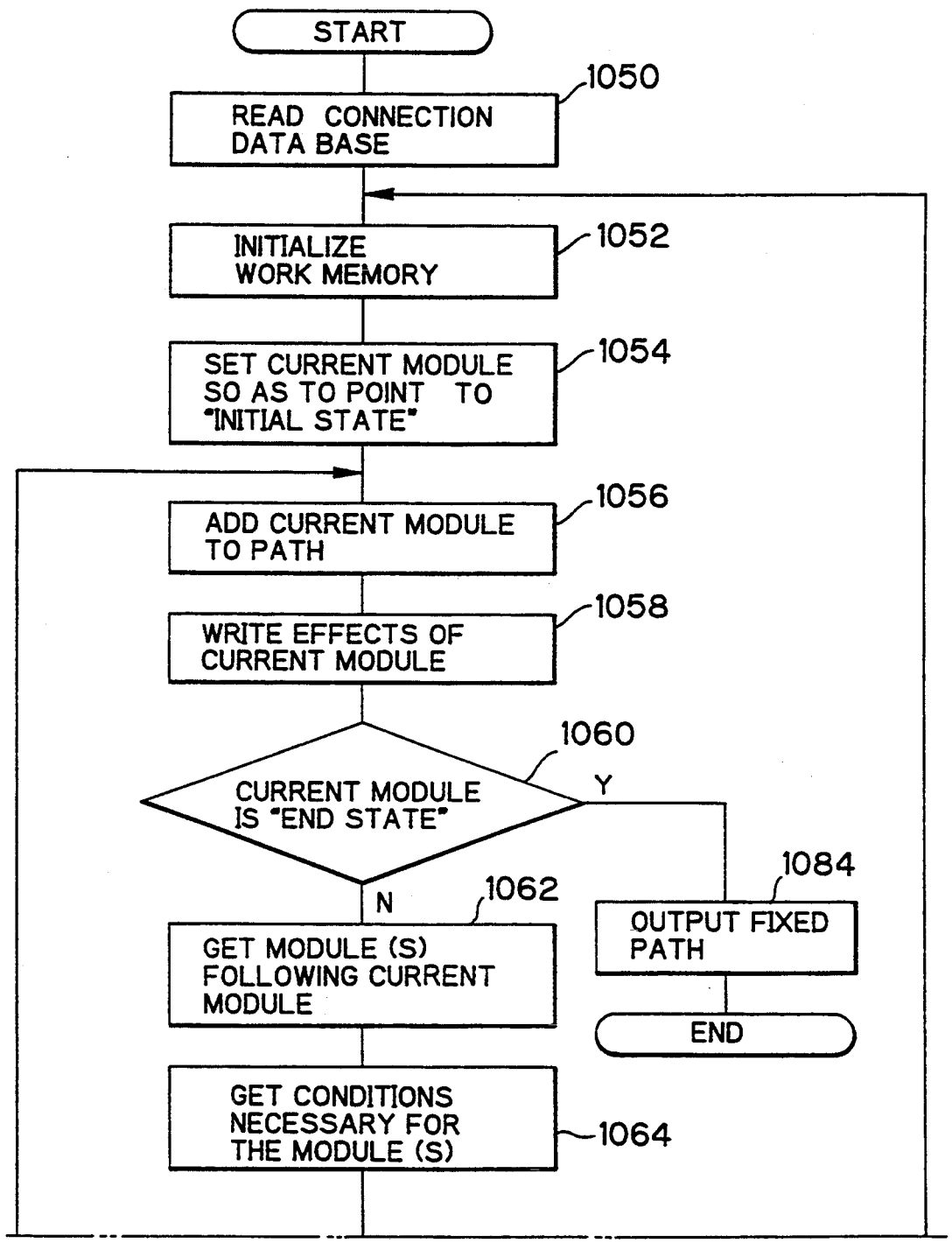
FIGS. 12(A) and 12(B) are flowcharts showing an operation of the inference device 30.
Figure 12B:
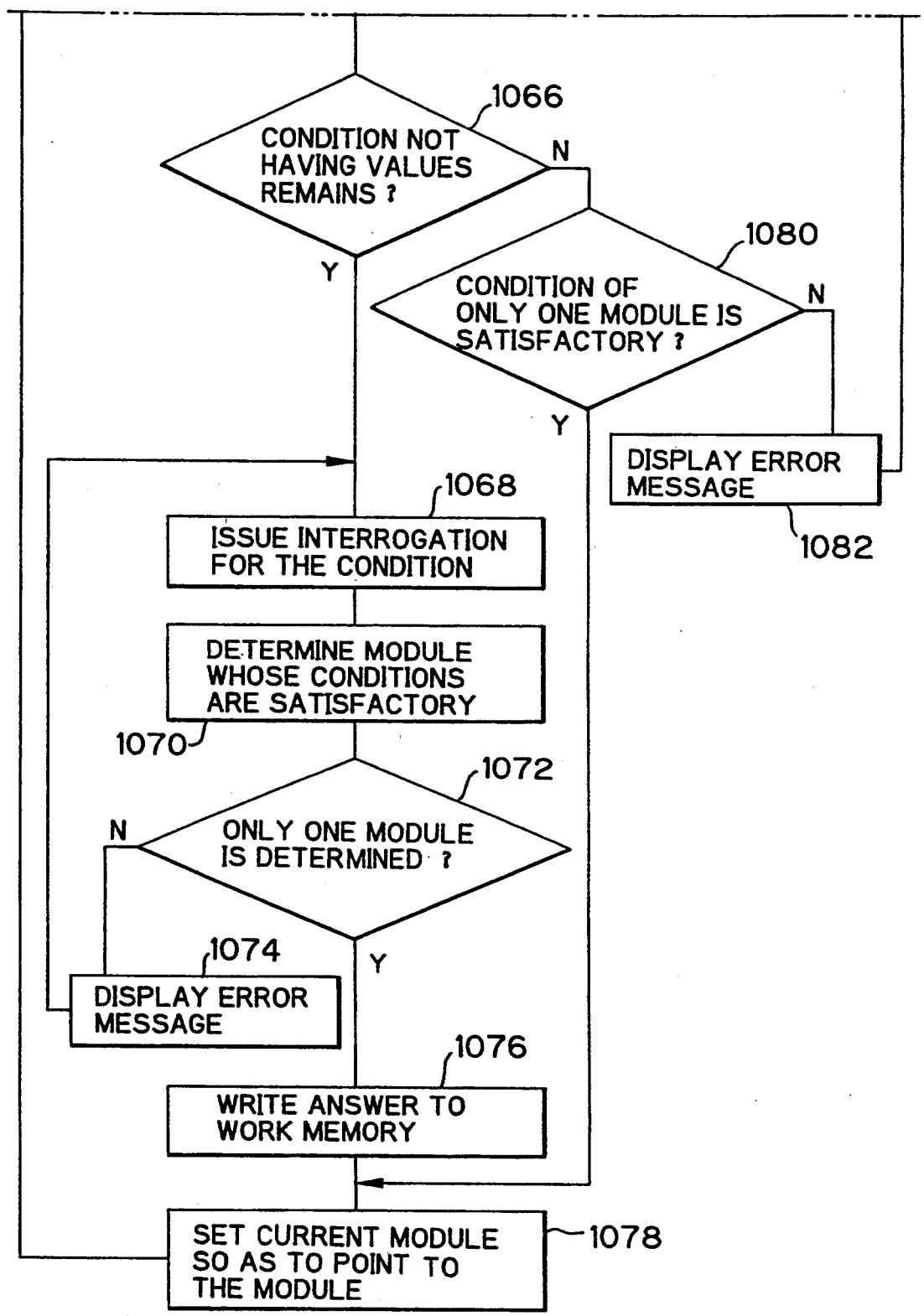

FIG. 12 shows an operation of the inference device 30. In step 1050, the inference device 30 reads the contents of the connection data base 16. In step 1052, a work memory storing values of all attributes of conditions is initialized so that all values are undefined. In step 1054, a pointer "current module" is set so as to point to the "initial state". In step 1056, a module pointed to by the "current module" is added to a path, and the value(s) of a condition(s), which is effected after the module is executed, is obtained from the knowledge data base 32 and is written into the work memory, in step 1058. If the module pointed to by the current module is not the "end state" in step 1060, a module(s) following the module pointed to by the current module is obtained in step 1062 from the contents read in the step 1050, and a condition(s) necessary for executing the module(s) following the current module are obtained from the knowledge data base 32 in step 1064. If a condition not having a definite value in the work memory exists as a condition(s) necessary for executing the following module(s) in step 1066, an interrogation message is displayed on the screen and the answer is input from the user until every necessary condition(s) is defined in step 1068. After every condition(s) necessary for executing the module(s) following the current module is defined, a module whose execution condition(s) is satisfactory is determined based on the answer(s) and the contents of the work memory in step 1070. If two or more modules or none of them satisfy the condition(s) in step 1072, an error message is displayed in step 1074 and the process is returned to the step 1068. If only one module is determined, the value input through the answer is written to the work memory in step 1076, the current module is set so as to point to the determined module in step 1078, and the process is returned to the step 1056.

In the example shown in FIGS. 4, 10 and 11, if the current module is in an "initial state", the procedures A and B are obtained as the modules following the initial state in the step 1062. An attribute "data" is obtained as the condition for executing the procedures A and B in step 1064. An interrogation "What is data form" and choices "Curved surface is included" and "Flat surface only" are displayed in step 1068. If the user selects the latter choice, the procedure A is determined as the module following the initial state in the step 1070, and the attribute "data" is set to "polygon" in the work memory in the step 1076. Then the current module is set so as to point to the procedure A in the step 1078 and the process to fix the path is continued.

In step 1066, if every condition(s) necessary for executing the module(s) following the current module is defined in the work memory, it is examined whether only one module satisfies the execution condition in step 1080. If not, an error message is displayed in step 1082, and the process is returned to the step 1052. If yes, the process is advanced to the step 1078.

If the "current module" points to the "end state" in step 1060, the fixed path is output to the program generation unit 20. The program generation unit 20 outputs a source program list 28 according to the fixed path as described with reference to FIG. 8.

In a modification of the aforementioned embodiment, the interrogation messages may be issued in a lump after the step 1052 in order to obtain answers from the user to the interrogations in a lump. In this case, the interrogation in the step 1068 is displayed only when an undefined value remains because the user did not answer all interrogations.

Figure 13:
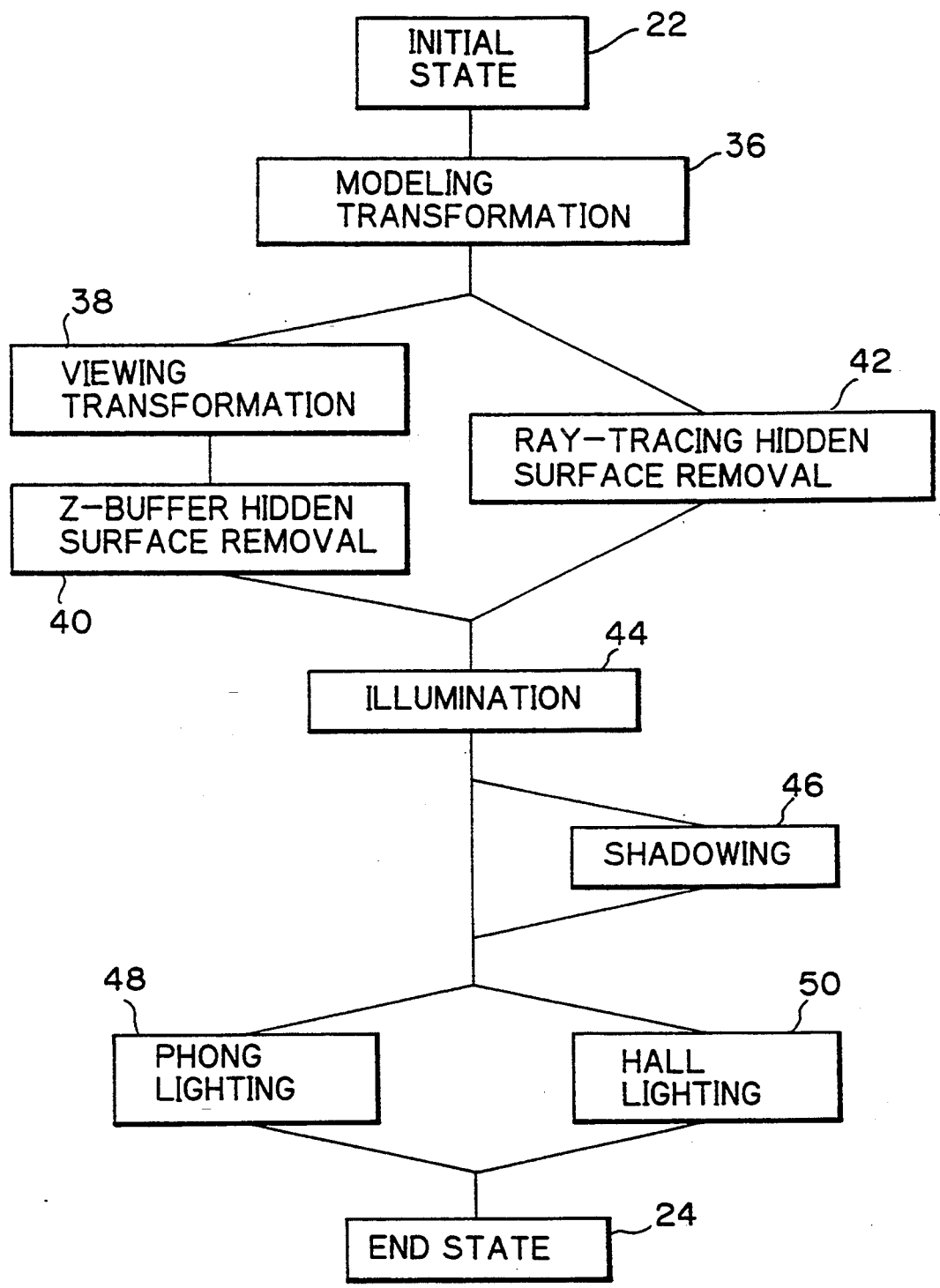
FIG. 13 is a diagram showing a practical example of the network structure.

FIG. 13 shows a practical example of the network structure of the software modules prepared in advance in order to automatically generate software programs in the field of computer graphics.

A module 36 for modeling transportation calculates three-dimensional coordinates of individual display objects by a modeling transformation. A module 38 for viewing transformation calculates views of the display objects from the three-dimensional coordinates thereof. A module 40 for z-buffer hidden surface removal removes hidden surfaces by using a z-buffer (depth buffer). A module 42 for ray-tracing hidden surface removal removes the hidden surfaces by ray-tracing. A module 44 for illumination calculates illumination of objects illuminated by a light source. A module 46 for shadowing adds shadows of objects. A module 48 for Phong lighting performs shading of objects using a Phong algorithm. A module 50 for Hall lighting performs shading of objects using Hall algorithm.

The ray-tracing hidden surface removal module 42 has the following input conditions.
"reflection" "occurs"
"penetration" "occurs"
"execution time" is "long"

The shadowing module 46 has following input conditions.
"execution time" is "short"
"penetration" "does not occur"

The Phong lighting module 48 has the following input conditions.
"execution time" is "short"
"penetration" "does not occur"

Figure 15:
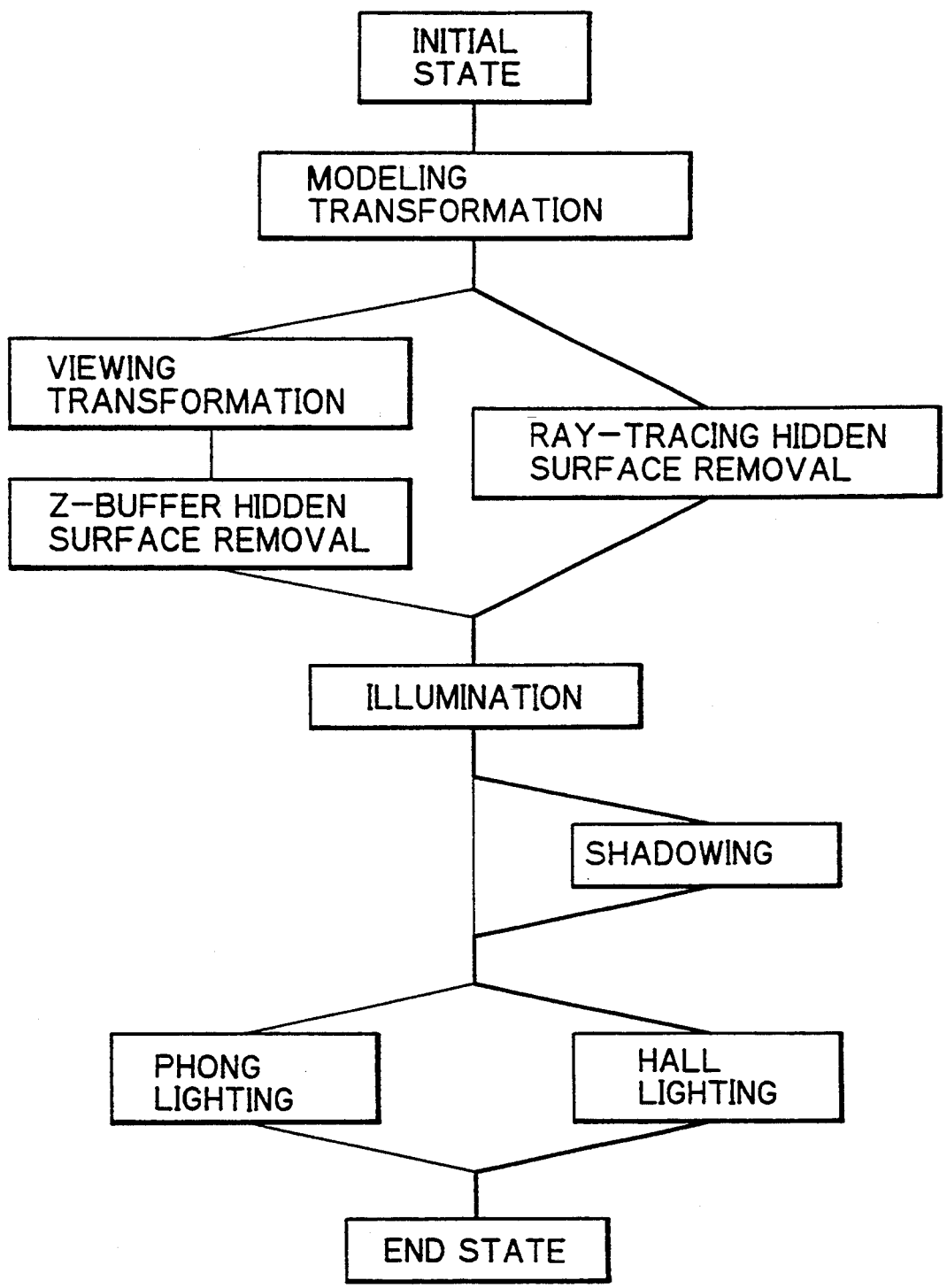
FIG. 15 is a diagram showing a fixed path determined in the network structure of FIG. 13.

In the above input conditions, the inference device 30 outputs interrogations in a lump as shown in FIG. 14. If the user selects answers as highlighted in FIG. 14, the inference device 30 fixes the path as shown by thick lines in FIG. 15.

As the user answered "yes" to the questions "Do mirror like surfaces exist?" and "Do transparent objects exist?", the module "ray-tracing hidden surface removal" is selected. Since the module "ray-tracing hidden surface removal" is selected, the condition "shadowing is necessary or not necessary" is changed to "necessary" as the effect of the module. Therefore, the module "shadowing" is selected though the user answered "No" to the question "Are shadows of objects necessary".

In the above embodiment, since program sources are generated only by answering questions issued from the inference device, the user need not know functions of modules or influence of one module on another, either. However, since the path is sequentially fixed from the initial state to the end state, optimum selection is not always obtained in the case where an answer influences two or more path selections. Namely, there is a case where an answer to an interrogation for a less important selection in a branch located nearer to the initial state forces selection of an inadequate module in a branch located farther from the initial state.

FIG. 16 shows an automatic program generation apparatus according to another embodiment of the present invention. In FIG. 16, the apparatus further includes a module designation unit 52 for enabling a user to designate a necessary module and/or an unnecessary module based on a measure of knowledge as to functions of modules in order to prune inadequate paths from the network before the inference device 30 fixes the path, to thereby prevent the aforementioned inadequate selection.

Figure 17B:
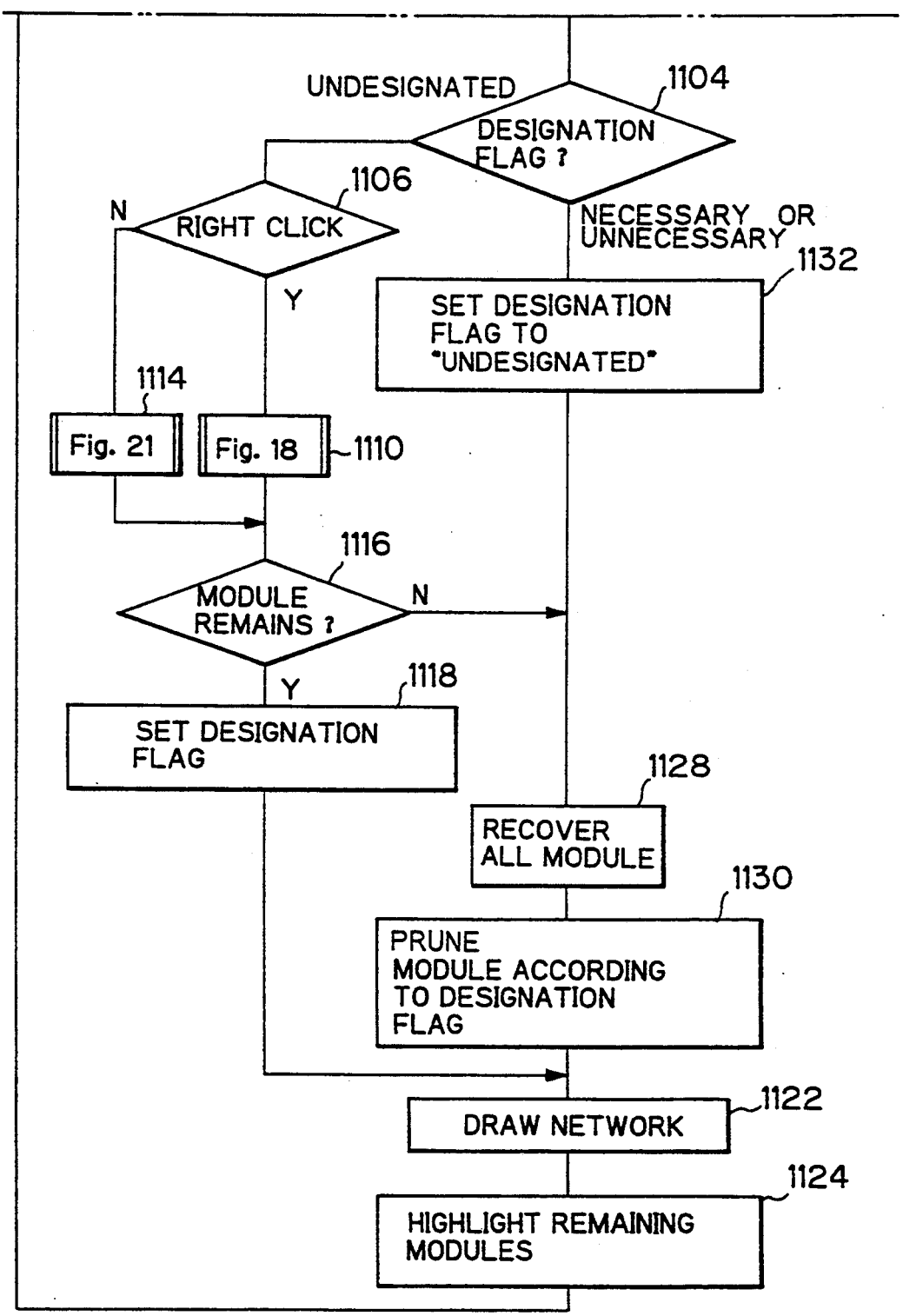
Figure 18:
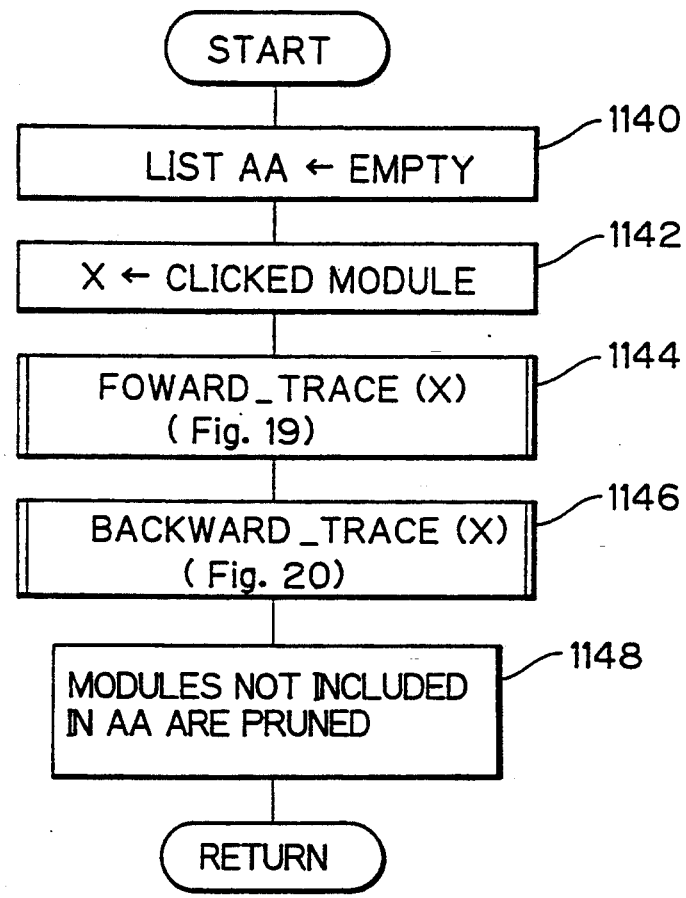
FIG. 18 is a flowchart showing a subroutine for pruning modules not associated with a necessary module.

FIG. 17 shows an operation of the apparatus including the module designation unit 52. In step 1090, the display control unit 12 displays the network structure shown in FIG. 4 and a software key "fix" according to the process described with reference to FIG. 5. In step 1092, the module designation unit 12 reads the contents of the connection data base 16, and in step 1094, sets all of designation flags provided for each of the modules to "undesignated". In step 1096, a position of the indicator is continuously obtained from the mouse until the mouse is clicked in step 1098. If the mouse is clicked, it is examined which figure is clicked in step 1100 and 1102. If a box of a module is clicked, a designation flag of the clicked module is examined in step 1104. If the flag is "undesignated", in step 1106, it is examined whether a right switch on the mouse is clicked or a left switch is clicked. If the right switch is clicked, in step 1110, a subroutine shown in FIG. 18 is called to determine modules that are not associated with the clicked module and to prune such modules. If the left switch is clicked, a subroutine shown in FIG. 21 is called to determine modules that are associated with the clicked module and to prune such modules in step 1114.

In the example of FIG. 4, if the procedure D is used, the procedures E and F are never used, that is to say, the procedures E and F are not associated with the procedure D. Therefore, if the procedure D is right-clicked, the procedures E and F are pruned. If the procedure D is not used, the procedures G and H are also not used, that is to say, the procedures G and H are associated with the procedure D. Therefore, if the procedure D is left-clicked, the procedures D, G and H are pruned. If the procedure C is carelessly left-clicked, all modules are pruned.

In step 1116, it is examined whether all modules are pruned through a user's own fault. If at least one module remains, the designation flag corresponding to the clicked module is set to "necessary" (if right-clicked) or "unnecessary" (if left-clicked) in step 1118. Then, the network is again drawn in step 1122, the remaining modules are highlighted in step 1122, and the process is returned to the step 1096. In the step 1100, if the software key "fix" is clicked, the inference device 30 fixes a path among the remaining modules through the process described with reference to FIG. 12, in step 1126.

Figure 21:
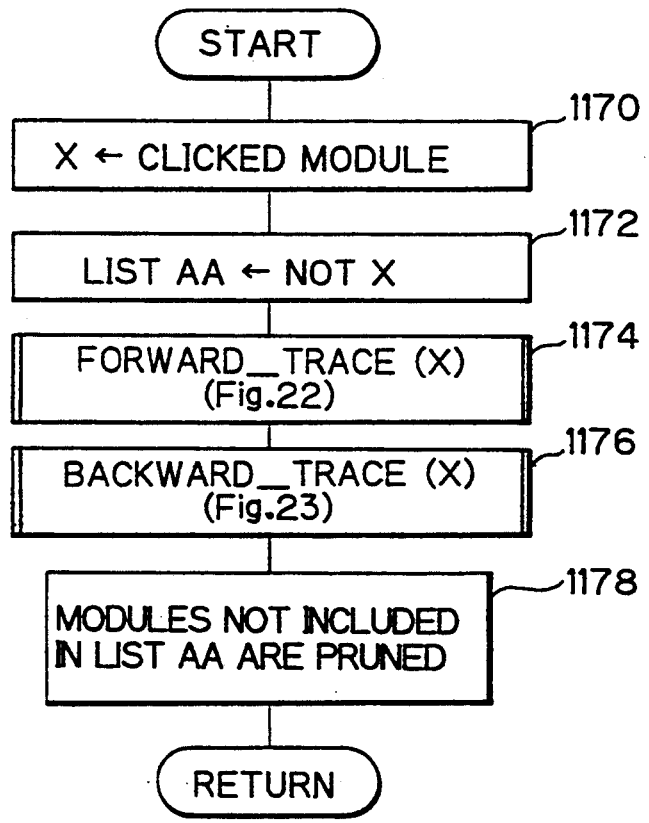
FIG. 21 is a flowchart showing a subroutine for pruning modules associated with an unnecessary module.

In step 1116, if all modules are pruned through a user's own fault, all modules are recovered in step 1128, the pruned modules are determined again by calling the subroutines shown in FIGS. 18 and 21 in accordance with the values of the designation flags, and the process is advanced to the step 1122. In step 1104, if the designation flag of the clicked module is "necessary" or "unnecessary", the designation flag is set to "undesignated" and the process is advanced to the step 1128.

Figure 19:
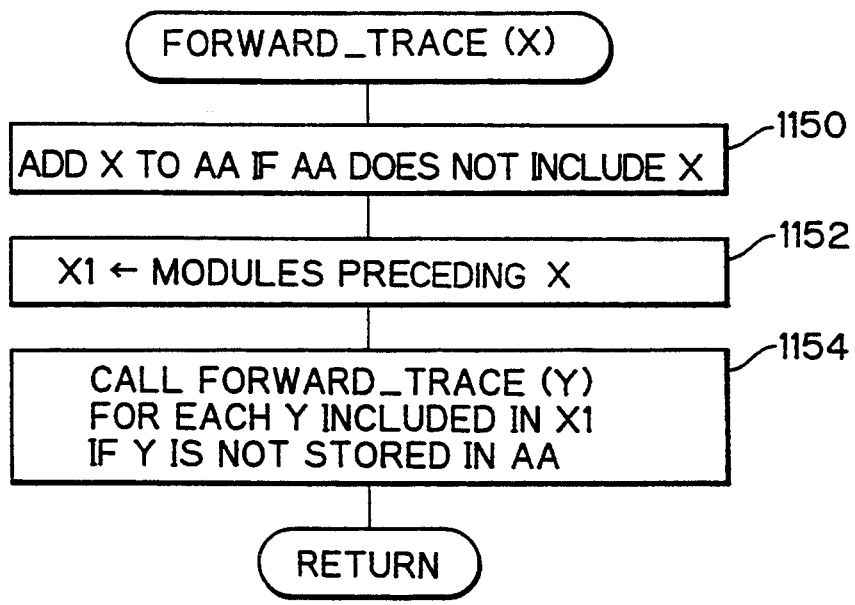
FIG. 19 is a flowchart showing a subroutine called in the routine of FIG. 18.
Figure 20:
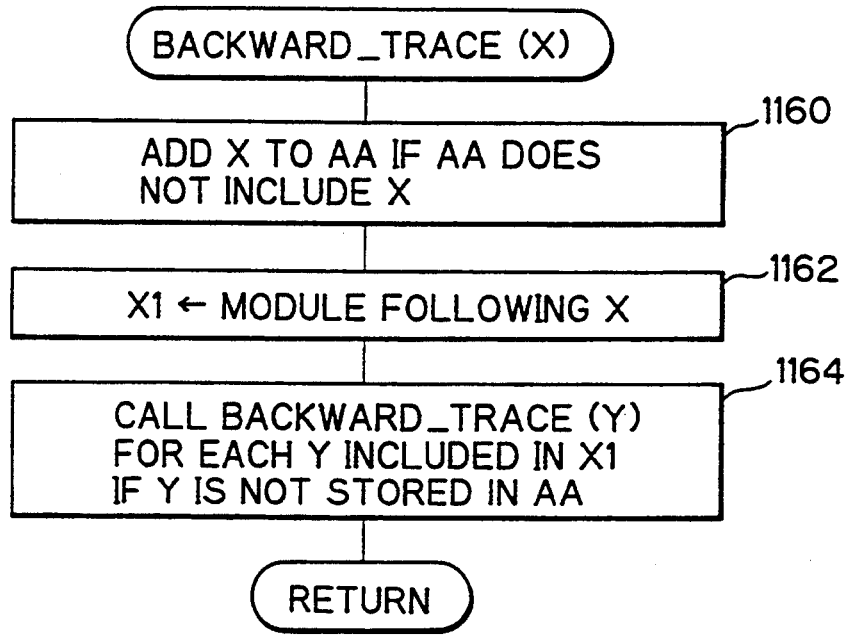
FIG. 20 is a flowchart showing another subroutine called in the routine of FIG. 18.

The subroutine shown in FIG. 18 to determine modules not associated with the clicked module is explained below. In step 1140, a list AA is emptied. In step 1142, a pointer pointing to clicked module is stored in a variable X, and in step 1144, a subroutine FORWARD-TRACE shown in FIG. 19 is called with an argument X to enter modules located in front of the module pointed to by X and the module itself into the list AA. In step 1146, a subroutine BACKWARD-TRACE shown in FIG. 20 is called with an argument X to enter modules located in back of the module X into the list AA. In step 1148, modules not included in the list AA are pruned.

In the FORWARD-TRACE subroutine shown in FIG. 19, if the list AA does not include the module X, the module is added to the list AA in step 1150. In step 1152, all modules preceding the module X are stored in a list X1. In step 1154, the FORWARD-TRACE itself is recursively called with an argument Y with regard to each member Y of the list X1 if Y is not stored in the list AA.

In the BACKWARD-TRACE subroutine of FIG. 20, if the list AA does not include the module pointed to by X, the module X is added to the list AA in step 1160. In step 1162, all modules following the module X are stored in a list X1. In step 1164, the BACKWARD-TRACE itself is recursively called with argument Y with regard to each member Y of the list X1 if the element Y is not stored in the list AA.

Figure 22:
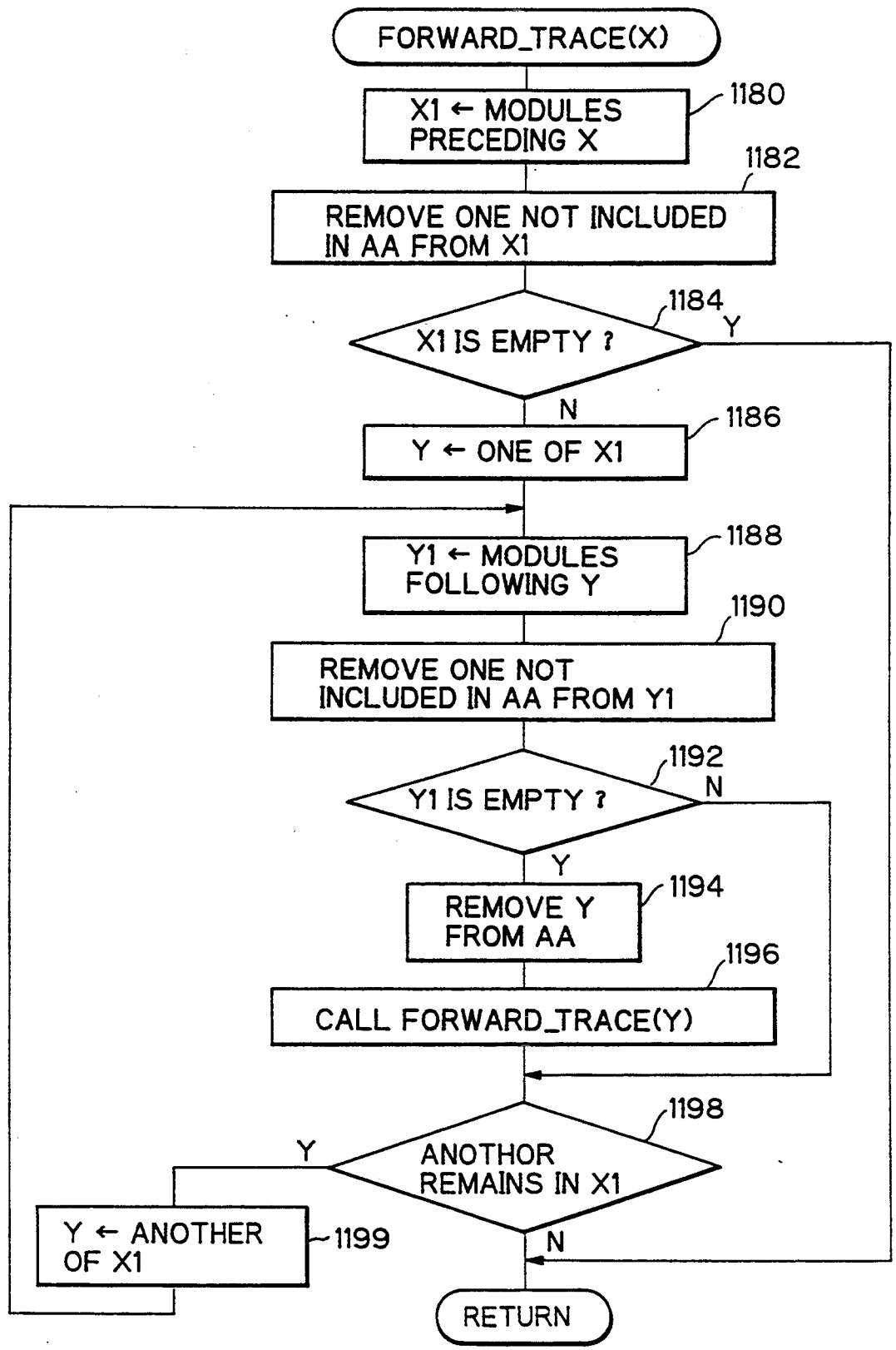
FIG. 22 is a flowchart showing a subroutine called in the routine of FIG. 21.
Figure 23:
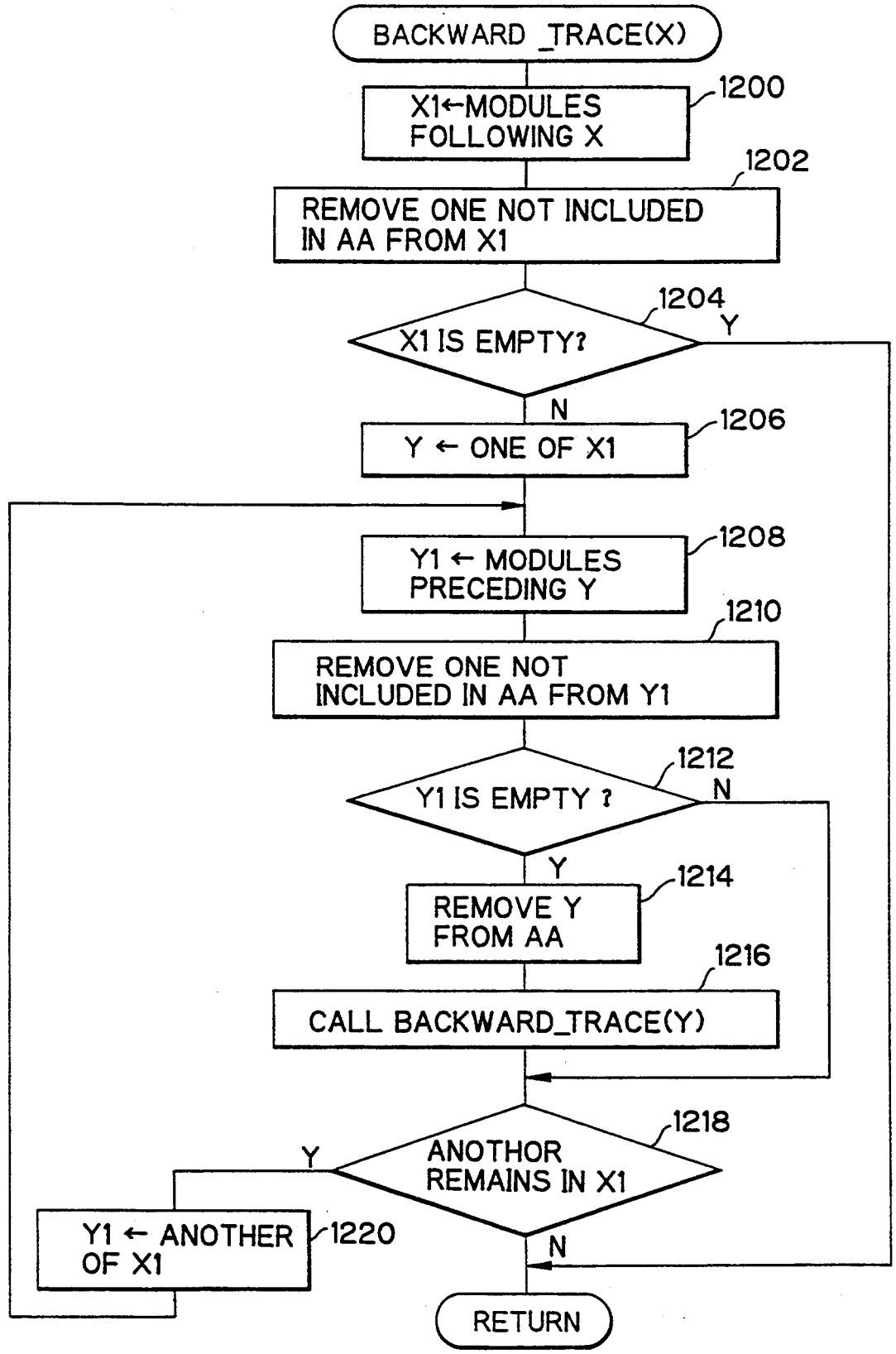
FIG. 23 is a flowchart showing another subroutine called in the routine of FIG. 21.

The subroutine shown in FIG. 21 to determine modules associated with the clicked module is explained below. In step 1170, a pointer pointing to the clicked module is stored in a variable X, and in step 1172, all modules except X are stored in the list AA. In step 1174, a subroutine FORWARD-TRACE shown in FIG. 22 is called with an argument X to remove modules located from the X through a diverging point in front of X from the list AA. In step 1176, a subroutine BACKWARD-TRACE shown in FIG. 23 is called with an argument X to remove modules located from X through a meeting point in back of X from the list AA. In step 1178, modules not included in the list AA are pruned.

In the FORWARD-TRACE subroutine shown in FIG. 22, modules preceding the module X are stored in a list X1 in step 1180, and modules not included in AA are removed from X1 in step 1182. If X1 is empty in step 1084, the process is returned to a calling routine. If X1 is not empty, one member of X1 is taken out from X1 and is stored in Y in step 1186. In step 1188, modules following Y are stored in a list Y1, and modules not included in AA are removed from Y1 in step 1190. If Y1 is empty in step 1192, the module Y is removed from AA in step 1194 and the FORWARD-TRACE subroutine is recursively called with an argument of Y in step 1196. If Y1 is not empty in the step 1192, the steps 1194 and 1196 are not executed. If another module does not remain in X1 in step 1198, the process is returned to a calling routine. If another moduls remains in X1, one of the other modules is taken out from X1 and is stored in Y in step 1199, and the process is returned to the step 1188.

In the BACKWARD-TRACE subroutine shown in FIG. 23, modules following the module X are stored in a list X1 in step 1200, and modules not included in AA are removed from X1 in step 1202. If X1 is empty in step 1204, the process is returned to a calling routine. If X1 is not empty, one member of X1 is taken out from X1 and is stored in Y in step 1206. In step 1208, modules preceding Y are stored in a list Y1, and modules not included in AA are removed from Y1 in step 1210. If Y1 is empty in step 1212, the module Y is removed from AA in step 1214 and the BACKWARD-TRACE subroutine is recursively called with an argument of Y in step 1216. If Y1 is not empty in step 1212, the steps 1214 and 1216 are not executed. If another module does not remain in X1 in step 1218, the process is returned to a calling routine. If another module remains in X1, one of the other modules is taken out from X1 and is stored in Y in step 1220, and the process is returned to the step 1208.

In the aforementioned embodiment, desired program sources are automatically generated by answering user-friendly guestions issued from the inference device and inadequate selection in the inference device is prevented by designating necessary modules and/or unnecessary modules. However, the user needs to have a measure of knowledge as to functions of modules in order to designate the necessary or unnecessary module on the network.

Figure 24:
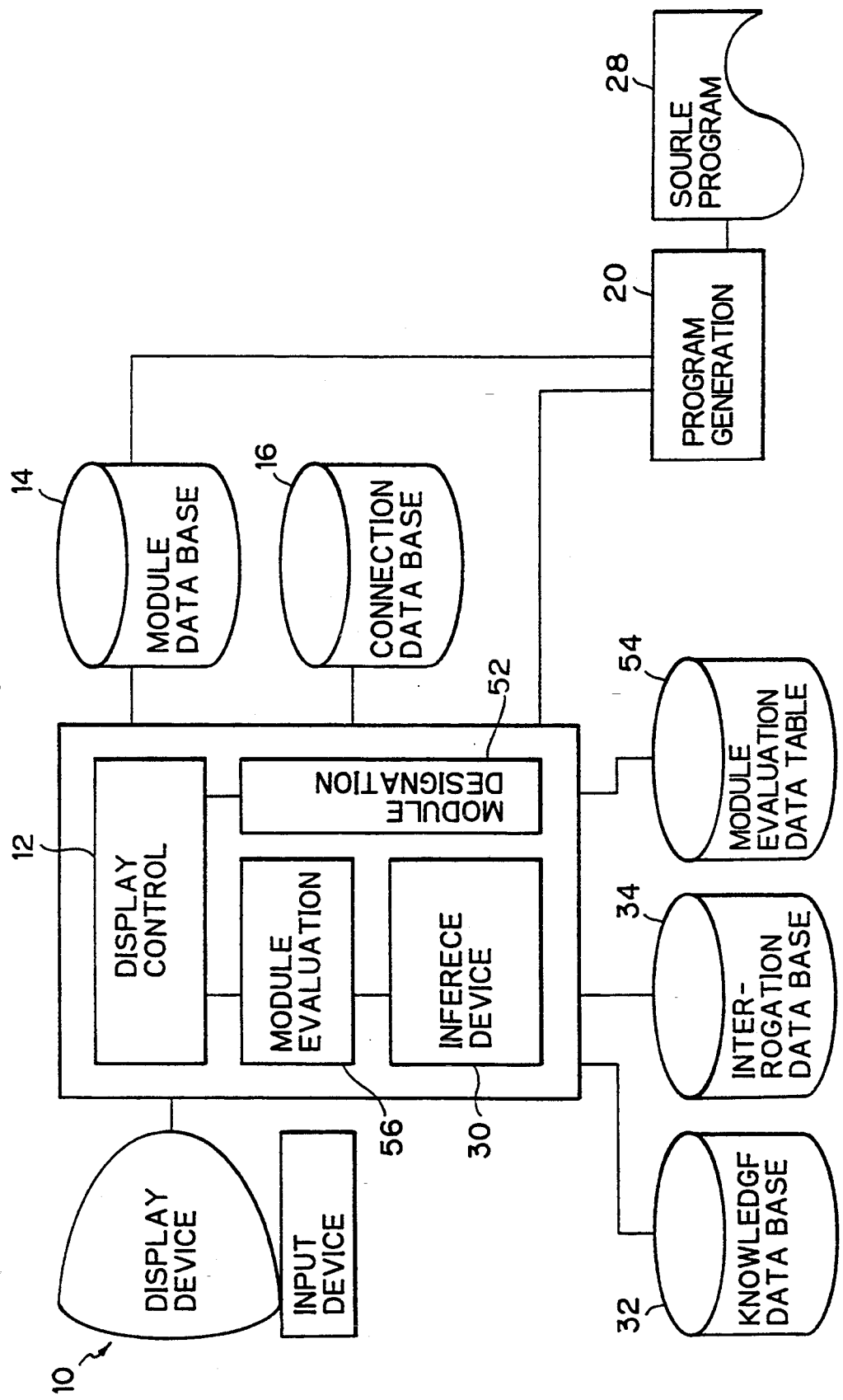
FIG. 24 is a block diagram of an automatic program generation apparatus according to another embodiment of the present invention.

FIG. 24 shows an automatic program generation apparatus according to another embodiment of the present invention wherein the designation of the necessary modules and the unnecessary modules is automatically performed after the user answers user-friendly questions. In FIG. 24, the apparatus further includes a module evaluation data table 54, and a module evaluation unit 56 which performs evaluation of necessity and adequateness of modules based ont he answers from a user and the contents of the module evaluation data table 54.

FIG. 25 shows an example of the contents of the module evaluation data table 54. As shown in FIG. 25, there is stored knowledge as to necessity or adequateness of each module in connection with various user's demands such that shadows exist or not and that delicate shadowing is necessary or not, based on knowledge of an expert, in the module evaluation data table 54.

Figure 26:
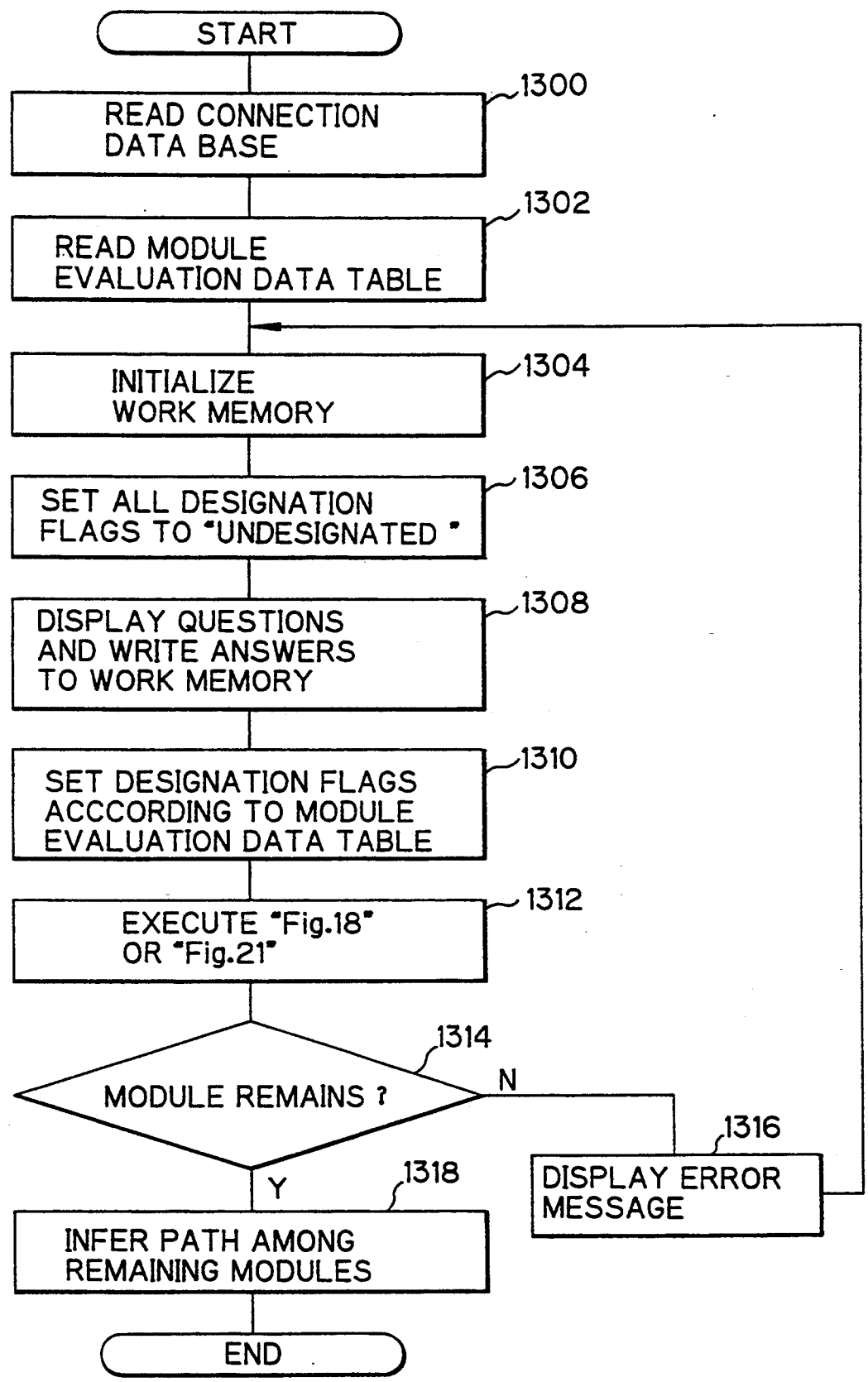
FIG. 26 is a flowchart showing an operation of the automatic program generation apparatus of FIG. 24.

FIG. 26 shows an operation of the automatic program generation apparatus provided with the module evaluation unit 56. In step 1300, the contents of connection data base 16 are read, and in step 1302, the contents of the module evaluation data table 54 are read. A work memory for storing the user's demands is initialized in step 1304, and all of the designation flags are set to "undesignated" in step 1306.

In step 1308, questions such as "Is delicate shadowing necessary?" are displayed in order to prompt the user to input the demande and the answers are written to the work memory. In step 1310, it is examined whether necessary modules or unnecessary module exist according to the contents of the work memory and the contents of the module evaluation data table 54. If a necessary module exists, the corresponding designation flag is set to "necessary", and if an unnecessary module exists, the corresponding designation flag is set "unnecessary". In step 1312, designation flags of all modules are examined, and if the flag is "necessary" the subroutine shown in FIG. 18 is called to prune modules not associated with the necessary module. If the flag is "unnecessary" the subroutine shown in FIG. 21 is called to prune modules associated with the unnecessary module and the unnecessary module itself. If step 1314, if all modules have been prunded, an error message is displayed in step 1316, and the process is returned to the step 1304. If at least a module remains, an inference process described with reference to FIG. 12 is executed to fix the path among remaining modules. In the inference process, adequateness of each module stored in the work memory is also considered. Namely, when selecting a module in a diverging point of the network, a more adequate module is selected according to the adequateness of the modules stored in the work memory.

Figure 27:
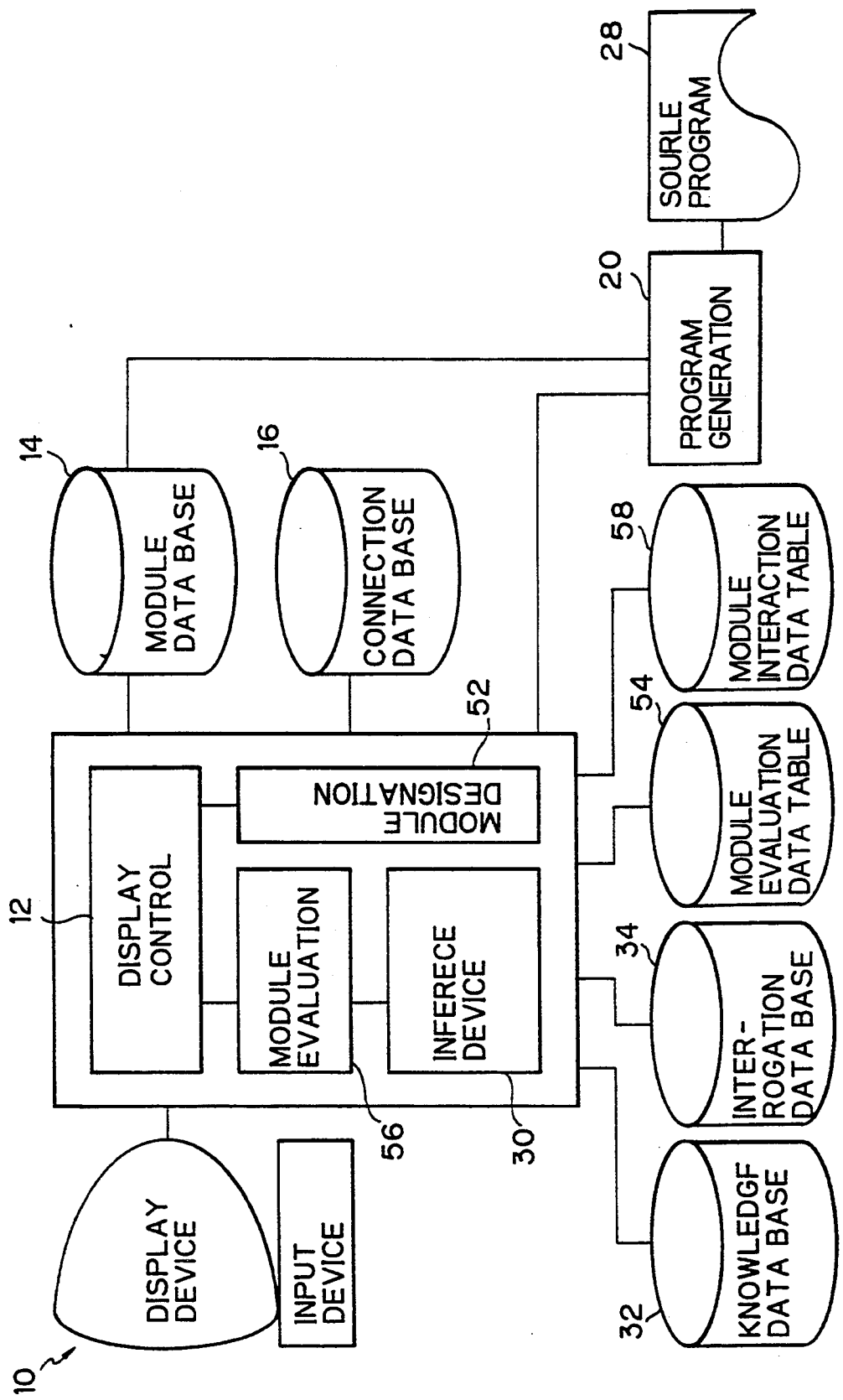
FIG. 27 is a block diagram of an automatic program generation apparatus according to another embodiment of the present invention.

In general, when a module is used, there often exists another module that must be used together with that module and a module that must not be used. On the other hand, when a module is not used, there often exists a module that must also not be used and a module that must be used. Namely, an interaction relationship exists among modules. An automatic program generation apparatus shown in FIG. 27 further refines candidates for used modules by utilizing the above interaction relationship among the modules. In FIG. 27, the apparatus further includes a module interaction data table 58 for storing the interaction relationship among the modules.

FIG. 28 shows an example of the contents of the module interaction data table 58. The example of FIG. 28 indicates that when the procedure A is used the procedure F must not be used, and when the procedure A is not used the procedure F must be used and the procedure H must not be used.

Figure 29A:
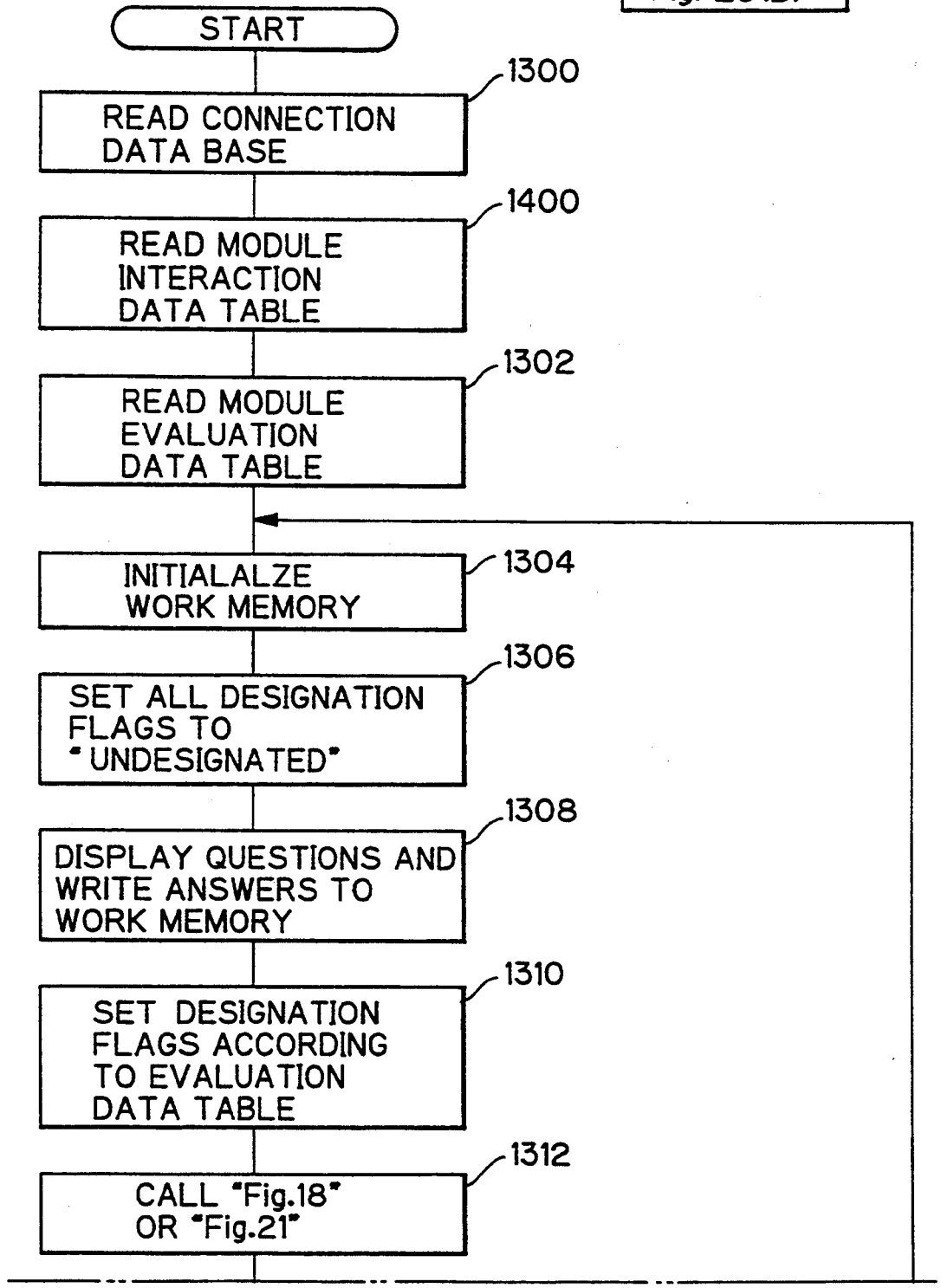
FIGS. 29(A) and 29(B) are flowcharts showing an operation of the automatic program generation apparatus of FIG. 27.
Figure 29B:
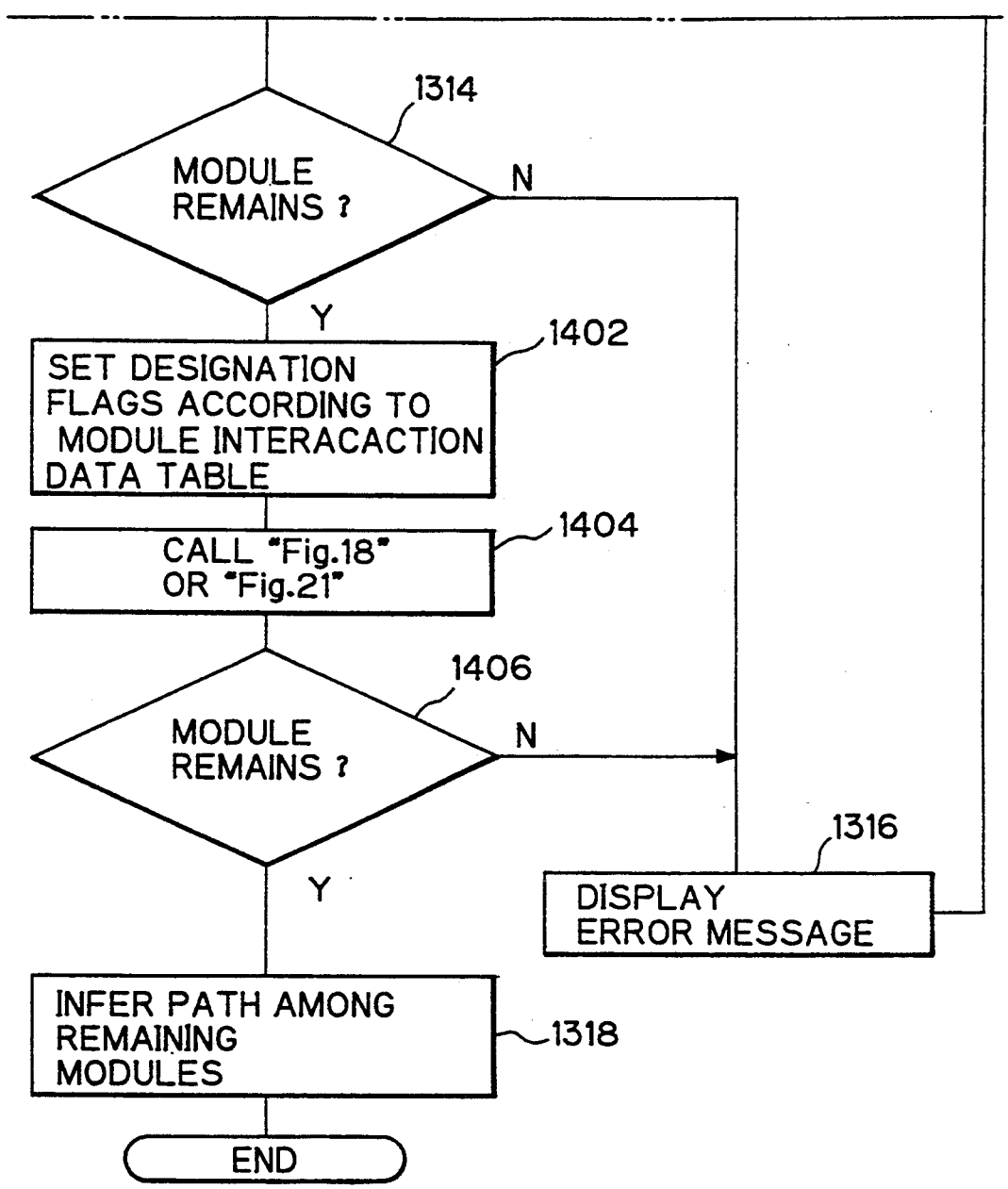

FIG. 29 shows an operation of the apparatus of FIG. 27. The same step number as used in FIG. 26 are used in FIG. 29 for steps that are the same as those in FIG. 26, and thus descriptions thereof are left out.

In step 1400, the contents of the module interaction data table 58 are read as initial processing. In step 1402, the contents of the module interaction data table 58 are examined with regard to each of the used modules and each of not used modules determined in the step 1312 in order to determine additional necessary modules and unnecessary modules and then the corresponding designation flags are set. In step 1404, the modules are further pruned by calling the subroutine of FIG. 18 or FIG. 21 according to the additionally defined designation flags.

I claim:

1. An apparatus for automatically generating a software program by selecting program modules from among a plurality of prepared program modules and by combining the selected program modules, comprising:

means for storing the prepared program modules;

means for storing connection relationships among the prepared program modules so that the prepared program modules and the relationships form a net work that functions in a direction from an initial state through an end state thereof;

means, operatively connected to said prepared program modules storing means and to said connection relationships storing means, for selecting program modules from among the prepared program modules so that the selected program modules and the relationships thereof determine a single path extending from the initial state through the end state of the network; and means, operatively connected to said program modules selecting means, for generating the software program by receiving the selected program modules from the prepared module storing means and by combining the received program modules along the path of the network.

2. An apparatus of claim 1, further comprising:

means for storing data which specify an input condition and an output condition with regard to each of the prepared program modules, the input condition being a condition that must be satisfied before a program module is executed, and the output condition being a condition that is effected after a program module is executed;

means for storing interrogation messages for allowing a user to manually effect input conditions, wherein the selecting means includes means for outputting the interrogation messages to the user to thereby allow the user to manually effect the input conditions; and means for sequentially determining the path which includes program modules that satisfy the input conditions among the network according to values of the input conditions that are manually effected or that are effected by a module belonging to the path already determined.

3. An apparatus of claim 2, further comprising:

means for designating a desired program module and an undesired module among the prepared program modules;

first means for deleting a program module that is not associated with the desired program module in the network before the path determining means sequentially determines the path; and second means for deleting the undesired program module and a program module that is associated with the undesired program module in the network before the path determining means sequentially determines the path.

4. An apparatus of claim 3, further comprising:

second means for storing data which indicates desired program module and undesired program module so as to satisfy a user's demand; and means for inputting the user's demand, wherein the designating means includes means for designating the desired program module and the undesired program module according to the inputted user's demand and the data stored in the second data storing means.

5. An apparatus of claim 4, wherein the second data storing means stores data indicating adequateness of the prepared modules in connection with the user's demand, and wherein the path determining means determines the path according to the data indicating adequateness of the prepared modules, said data being specified by the inputted user's demand.

6. An apparatus of claim 5, further comprising:

means for storing data of interaction relationships between the prepared program modules;

means for further designating the desired program module and undesired program module according to the interaction relationship data of program module that has been deleted by the first and the second deleting means and according to the interaction relationship data of a program module that has not been deleted by the first and the second deleting means;

third means for deleting a program module that is not associated with the desired program module designated by the further designating means before the path determining means determines the path; and fourth means for deleting the undesired program module designated by the further designating means and a program module that is associated with the undesired program module designated by the further designating means.

7. An apparatus of claim 3, wherein the designating means includes:

means for outputting the network to the user; and means for allowing the user to manually designate the desired program module and the undesired program module on the output network.

8. An apparatus of claim 3, further comprising:

means for storing data of interaction relationships between the prepared program modules;

means for further designating the desired program module and undesired program module according to the interaction relationship data of a program module that has been deleted by the first and the second deleting means and according to the interaction relationship data of a program module that has not been deleted by the first and the second deleting means;

third means for deleting a program module that is not associated with the desired program module designated by the further designating means before the path determining means determines the path; and fourth means for deleting the undesired program module designated by the further designating means and a program module that is associated with the undesired program module designated by the further designating means.

9. An apparatus of claim 1, wherein the selecting means includes:

means for outputting the network to a user; and means for allowing the user to manually select the program modules on the output network.

* * * * *